United States Patent
Zhai et al.

(10) Patent No.: US 10,671,281 B2
(45) Date of Patent: *Jun. 2, 2020

(54) NEURAL NETWORK FOR KEYBOARD INPUT DECODING

(71) Applicant: Google LLC, Mountain View, CA (US)

(72) Inventors: Shumin Zhai, Los Altos, CA (US); Thomas Breuel, Mountain View, CA (US); Ouais Alsharif, Sunnyvale, CA (US); Yu Ouyang, San Jose, CA (US); Francoise Beaufays, Mountain View, CA (US); Johan Schalkwyk, Scarsdale, NY (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/261,640

(22) Filed: Jan. 30, 2019

(65) Prior Publication Data
US 2019/0155504 A1 May 23, 2019

Related U.S. Application Data

(63) Continuation of application No. 15/473,010, filed on Mar. 29, 2017, now Pat. No. 10,248,313, which is a
(Continued)

(51) Int. Cl.
*G06F 3/02* (2006.01)
*G06F 3/0488* (2013.01)
(Continued)

(52) U.S. Cl.
CPC ........ *G06F 3/04886* (2013.01); *G06F 3/0219* (2013.01); *G06F 3/0233* (2013.01);
(Continued)

(58) Field of Classification Search
CPC ........ G06F 3/02; G06F 3/0219; G06F 3/0233; G06F 3/0237; G06F 3/0482;
(Continued)

(56) References Cited

U.S. PATENT DOCUMENTS

| 5,774,357 A | 6/1998 | Hoffberg et al. |
| 7,042,442 B1 | 5/2006 | Kanevsky et al. |

(Continued)

FOREIGN PATENT DOCUMENTS

| CN | 101689245 | 3/2010 |
| CN | 101730898 | 6/2010 |
| CN | 102378951 | 3/2012 |

OTHER PUBLICATIONS

"First Office Action without Interview", U.S. Appl. No. 15/473,010, dated Sep. 12, 2018, 2 pages.
(Continued)

*Primary Examiner* — Joe H Cheng
(74) *Attorney, Agent, or Firm* — Colby Nipper

(57) ABSTRACT

In some examples, a computing device includes at least one processor; and at least one module, operable by the at least one processor to: output, for display at an output device, a graphical keyboard; receive an indication of a gesture detected at a location of a presence-sensitive input device, wherein the location of the presence-sensitive input device corresponds to a location of the output device that outputs the graphical keyboard; determine, based on at least one spatial feature of the gesture that is processed by the computing device using a neural network, at least one character string, wherein the at least one spatial feature indicates at least one physical property of the gesture; and output, for display at the output device, based at least in part
(Continued)

on the processing of the at least one spatial feature of the gesture using the neural network, the at least one character string.

20 Claims, 7 Drawing Sheets

Related U.S. Application Data continuation of application No. 14/683,861, filed on Apr. 10, 2015, now Pat. No. 9,678,664.

(51) Int. Cl.

| | |
|---|---|
| *G06N 3/04* | (2006.01) |
| *G06F 40/232* | (2020.01) |
| *G06F 40/274* | (2020.01) |
| *G06F 40/279* | (2020.01) |
| *G06F 3/023* | (2006.01) |
| *G06F 3/0489* | (2013.01) |
| *G06F 3/0482* | (2013.01) |
| *G06N 3/08* | (2006.01) |

(52) U.S. Cl.
CPC .......... *G06F 3/0237* (2013.01); *G06F 3/0482* (2013.01); *G06F 3/04883* (2013.01); *G06F 3/04895* (2013.01); *G06F 40/232* (2020.01); *G06F 40/274* (2020.01); *G06F 40/279* (2020.01); *G06N 3/0445* (2013.01); *G06N 3/08* (2013.01)

(58) Field of Classification Search
CPC ............. G06F 3/04883; G06F 3/04886; G06F 3/04895; G06F 17/273; G06F 17/276; G06F 17/2765; G06N 3/02; G06N 3/0445; G06N 3/08; G10L 15/16
See application file for complete search history.

(56) References Cited

U.S. PATENT DOCUMENTS

| | | | |
|---|---|---|---|
| 8,078,557 | B1 | 12/2011 | Ershov |
| 8,484,573 | B1 | 7/2013 | Zhai et al. |
| 8,504,361 | B2 | 8/2013 | Collobert et al. |
| 9,678,664 | B2 | 6/2017 | Zhai et al. |
| 10,248,313 | B2 * | 4/2019 | Zhai ...................... G06F 3/0219 |
| 2005/0169527 | A1 | 8/2005 | Longe et al. |
| 2007/0040813 | A1 | 2/2007 | Kushler et al. |
| 2011/0210850 | A1 | 9/2011 | Tran |
| 2012/0036469 | A1 | 2/2012 | Suraqui |
| 2012/0079412 | A1 | 3/2012 | Kocienda et al. |
| 2013/0046544 | A1 | 2/2013 | Kay et al. |
| 2013/0246322 | A1 | 9/2013 | De Sousa Webber |
| 2013/0311925 | A1 | 11/2013 | Denker et al. |
| 2014/0082545 | A1 | 3/2014 | Zhai et al. |
| 2014/0098023 | A1 | 4/2014 | Zhai et al. |
| 2014/0104175 | A1 | 4/2014 | Ouyang et al. |
| 2014/0104177 | A1 | 4/2014 | Ouyang et al. |
| 2014/0201671 | A1 | 7/2014 | Zhai et al. |
| 2014/0218299 | A1 * | 8/2014 | Kataoka .............. G06F 3/04883 345/168 |
| 2014/0327622 | A1 | 11/2014 | Ouyang et al. |
| 2016/0282956 | A1 | 9/2016 | Ouyang et al. |
| 2016/0299685 | A1 | 10/2016 | Zhai et al. |
| 2017/0199665 | A1 | 7/2017 | Zhai et al. |

OTHER PUBLICATIONS

"Notice of Allowance", U.S. Appl. No. 15/473,010, dated Nov. 29, 2018, 5 pages.
"Preinterview First Office Action", U.S. Appl. No. 15/473,010, dated Jun. 28, 2018, 4 pages.
Azenkot et al., "Touch Behavior with Different Postures on Soft Smartphone Keyboards", Proceedings of the 14th International conference on Human-computer interaction with mobile devices and services, Sep. 2012, 10 pgs.
Bautista et al., "Probability-based Dynamic Time Warping for Gesture Recognition on RGB-D data", Advances in Depth Image Analysis and Applications, Nov. 2012, 11 pgs.
Bengio et al., "A Neural Probabilistic Language Model", Journal of Machine Learning Research 3, Feb. 2003, 19 pgs.
Bengio et al., "Learning Long-Term Dependencies with Gradient Descent is Difficult", IEEE Transactions on Neural Networks, vol. 5, No. 2, Mar. 1994, 10 pgs.
Communication Pursuant to Rules 161(1) and 162 EPC dated Nov. 24, 2017, from counterpart European Application No. 16712166.4, 2 pp.
Dean et al., "Large Scale Distributed Deep Networks", NIPS 2012: Neural Information Processing Systems, Dec. 2012, 11 pgs.
Graves et al., "Connectionist Temporal Classification: Labelling Unsegmented Sequence Data with Recurrent Neural Networks", Proceedings of the 23rd International Conference on Machine Learning, Jun. 2006, 8 pgs.
Graves et al., "Speech Recognition with Deep Recurrent Neural Networks", IEEE international Conference on Acoustics, Speech and Signal Processing (ICASSP), 2013, 5 pgs. Applicant points out, in accordance with MPEP 609.04(a), that the year of publication, 2013, is sufficiently earlier than the effective U.S. filing date, Mar. 29, 2017, so that the particular month of publication is not in issue.
Graves et al., "Towards End-to-End Speech Recognition with Recurrent Neural Networks", Proceedings of the 31st International Conference on Machine Learning, vol. 32, Jun. 2014, 9 pgs.
Hochreiter et al., "Long Short-Term Memory", Neural Computation, vol. 8, No. 8, 1997, 32 pgs. Applicant points out, in accordance with MPEP 609.04(a), that the year of publication, 1997, is sufficiently earlier than the effective U.S. filing date, Mar. 29, 2017, so that the particular month of publication is not in issue.
Hochreiter et al., "Long Short-Term Memory," Neural Computation, vol. 9, No. 8, Nov. 15, 1997, pp. 1735-1780.
International Preliminary Report on Patentability from International Application No. PCT/US2016/022659, dated Oct. 19, 2017, 9 pp.
Klimt et al., "Introducting the Enron Corpus", Proceedings of the Conference on Email and AntiSpam, 2004, 2 pgs. Applicant points out, in accordance with MPEP 609.04(a), that the year of publication, 2004, is sufficiently earlier than the effective U.S. filing date, Mar. 29, 2017, so that the particular month of publication is not in issue.
Kristensson et al., "SHARK2: A Large Vocabulary Shorthand Writing System for Pen-based Computers", Proceedings of the 17th Annual ACM Symposium on User Interface Software and Technology, 2004, 10 pgs. Applicant points out, in accordance with MPEP 609.04(a), that the year of publication, 2004, is sufficiently earlier than the effective U.S. fling date, Mar. 29, 2017, so that the particular month of publication is not in issue.
Lawrence et al., "Natural Language Grammatical Inference with Recurrent Neural Networks", IEEE Transactions on Knowledge and Data Engineering, vol. 12, No. 1, Jan./Feb. 2000, 15 pgs.
Lin et al., "Computer-access authentication with neural network based keystroke identify verification", Retrieved on Jun. 4, 2015 from http://ieeexplore.ieee.org/xpl/login.jsp?tp=&arnumber=611659&url=http%3A%2F%2Fieeexplore.ieee.org%2Fxpls%2Fabs_all.jsp%3Farnumber%3D611659, 2 pgs.
Linaje et al., "Classifying gestures by using a self-organizing neural network", Retrieved on Jun. 4, 2015 from http://ieeexplore.ieee.org/xpl/login.jsp?tp=&arnumber=884166&url=http%3A%2F%2Fieeexplore.ieee.org%2Fxpls%2Fabs_all.jsp%3Farnumber%3D884166, 2 pgs.
Liwicki et al., "A Novel Approach to On-Line Handwriting Recognition Based on Bidirectional Long Short-Term Memory Networks", Proceedings of the 9th International Conference on Document Analysis and Recognition, 2007, 5 pgs. Applicant points out, in accordance with MPEP 609.04(a), that the year of publication, 2007, is sufficiently earlier than the effective U.S. filing date, Mar. 29, 2017, so that the particular month of publication is not in issue.

(56) References Cited

OTHER PUBLICATIONS

Matlab Projects: Hand Gesture Recognition Using Neural Network, Retrieved on Jun. 4, 2015 from http://matlabsproj.blogspot.com/2012/06/hand-gesture-recognition-using-neural.html, 26 pgs.

Mitra et al., "Gesture Recognition: A Survey", IEEE Transactions on Systems, Man, and Cybernetics—Part C: Applications and Reviews, vol. 37, No. 3, May 2007, 14 pgs.

Mohri, "Finite-State Transducers in Language and Speech Processing", Computational Linguistics, vol. 23, No. 2, Jun. 1997, 42 pgs.

Nakamura et al., "Neural Network Approach to Word Category Prediction for English Texts", Proceedings of the 13th conference on Computational linguistics, vol. 3, Aug. 1990, 6 pgs.

Ouazzane et al., "An Intelligent Keyboard Framework for Improving Disabled People Computer Accessibility", Engineering Applications of Neural Networks: 12th International Conference,EANN 2011 and 7th IFIP WG 12.5 International Conference, AIAI 2011, Sep. 15-18, 2011, pp. 384-390.

Prediction using neural networks, Retrieved on Jun. 4, 2015 from http://www.obitko.com/tutorials/neural-network-prediction/, 1 pg.

Prosecution History from U.S. Appl. No. 14/683,861, filed Apr. 10, 2015, from Oct. 5, 2016 through Feb. 13, 2017.

Rabiner, "A Tutorial on Hidden Markov Models and Selected Applications in Speech Recognition", Proceedings of the IEEE, vol. 77, No. 2, Feb. 1989, 30 pgs.

Response to Communication Pursuant to Rules 161(1) and 162 EPC dated Nov. 24, 2017, from counterpart European Application No. 16712166.4, filed Apr. 20, 2018, 6 pp.

Rivest et al., "Conditioning and Time Representation in Long Short-Term Memory Networks," Biological Cybernetics, vol. 108. No. 1, Feb. 1, 2014, pp. 23-48.

Russel et al., "Artificial Intelligence A Modern Approach", Third Edition, 2010, 1152 pgs. Applicant points out, in accordance with MPEP 609.04(a), that the year of publication, 2010, is sufficiently earlier than the effective U.S. filing date, Mar. 29, 2017, so that the particular month of publication is not in issue.

Sak et al., "Long Short-Term Memory Based Recurrent Neural Network Architectures for Large Vocabulary Speech Recognition", arXiv:1402.1128v1, Feb. 5, 2014, 5 pgs.

Williams et al., "A Learning Algorithm for Continually Running Fully Recurrent Neural Networks", Neural Computation, vol. 1, No. 2, Jun. 1989, 10 pgs.

Wilson et al., "Hidden Markov Models for Modeling and Recognizing Gesture Under Variation", International Journal of Pattern Recognition and Artificial Intelligence, Feb. 2001, 36 pgs.

Zhai et al., "Shorthand Writing on Stylus Keyboard", CHI '03 Proceedings of the SIGCHI Conference on Human Factors in Computing Systems, Apr. 2003, 8 pgs.

Zhai et al., "The Word-Gesture Keyboard: Reimagining Keyboard Interaction", Communications of the ACM, vol. 55, No. 9, Sep. 2012, 11 pgs.

Prosecution History from U.S. Appl. No. 15/473,010, dated Jun. 28, 2018 through Nov. 29, 2018, 15 pp.

"English Handwriting Recognition Based on Long and Short Memory Recurrent Neural Network", Wei Xiaoxin, China Excellent Master's Thesis Full-text Database, pp. 25-44, Jan. 15, 2015, 22 pages.

"Foreign Office Action", Chinese Application No. 201680018860.5, Jan. 14, 2020, 23 pages.

\* cited by examiner

NEURAL NETWORK FOR KEYBOARD INPUT DECODING

This application is a Continuation of U.S. application Ser. No. 15/473,010, filed Mar. 29, 2017, which issued as U.S. Pat. No. 10,248,313, which is a Continuation of U.S. application Ser. No. 14/683,861, filed Apr. 10, 2015, which issued on Jun. 13, 2017 as U.S. Pat. No. 9,678,664, the entire content of each of which is hereby incorporated by reference.

BACKGROUND

Some computing devices provide a graphical keyboard as part of a user interface for text entry. For instance, a presence-sensitive display included in or coupled to a computing device may output a graphical keyboard that enables a user to enter data by indicating keys displayed at the presence-sensitive display. In some cases, the computing device may present a graphical keyboard with which a user can interact by tapping individual keys of the keyboard or by sliding a finger over successive regions associated with desired keys. In this way, graphical keyboards provide an input method that allows a user to enter characters, words, or groups of words by entry of one or more gestures. As such, a graphical keyboard may allow a user to quickly and accurately enter text into a computing device.

A computing device that receives gesture input from a graphical keyboard may employ word prediction, autocorrection, and/or suggestion techniques to determine words indicated by the gesture input. Such techniques may enable a user to speed up text entry and reduce spelling mistakes, but may also result in input errors. As such, a user may need to perform additional actions to correct erroneously interpreted input, thus slowing down user input and reducing the efficiency of gesture-based text input.

SUMMARY

In one example, a computing device includes at least one processor; and at least one module, operable by the at least one processor to: output, for display at an output device operatively coupled to the computing device, a graphical keyboard; receive an indication of a gesture detected at a location of a presence-sensitive input device, wherein the location of the presence-sensitive input device corresponds to a location of the output device that outputs the graphical keyboard; determine, based on at least one spatial feature of the gesture that is processed by the computing device using a neural network, at least one character string, wherein the at least one spatial feature indicates at least one physical property of the gesture; and output, for display at the output device, based at least in part on the processing of the at least one spatial feature of the gesture using the neural network, the at least one character string.

In one example, a computer-readable storage medium encoded with instructions that, when executed, cause at least one processor to: output, for display at an output device operatively coupled to the computing device, a graphical keyboard; receive an indication of a gesture detected at a location of a presence-sensitive input device, wherein the location of the presence-sensitive input device corresponds to a location of the output device that outputs the graphical keyboard; determine, based on at least feature that is processed by the computing device using a neural network, at least one character string; and output, for display at the output device, based at least in part on the processing of the at least feature that is processed by the computing device using the neural network, the at least one character string.

In one example, a method includes outputting, by a computing device and for display at an output device operatively coupled to the computing device, a graphical keyboard; receiving, by the computing device, an indication of a gesture detected at a location of a presence-sensitive input device, wherein the location of the presence-sensitive input device corresponds to a location of the output device that outputs the graphical keyboard; determining, based on the gesture that is processed by the computing device using the neural network, at least one character string; and outputting, by the computing device and for display at the output device, based at least in part on the processing of the gesture that is processed by the computing device using a neural network, the at least one character string.

The details of one or more examples are set forth in the accompanying drawings and the description below. Other features, objects, and advantages of the disclosure will be apparent from the description and drawings, and from the claims.

DETAILED DESCRIPTION

In general, techniques of this disclosure are directed to the use of one or more neural networks to decode user input entered at a graphical keyboard. In some examples, a computing device that outputs a graphical keyboard for display may receive indications of user input that correspond to gestures (such as taps and/or continuous gestures) entered at or across various locations of the graphical keyboard. The computing device may determine input values for various features associated with the indications of user input (such as positional coordinates of the user inputs at a presence-sensitive input device, particular keys traversed by the user input, time values at which the computing device determined the user inputs, and types of the user inputs. As the computing device detects user inputs over time (e.g., subsequent taps and/or portions of continuous gestures), the computing device may generate a sequence of "frames" of input values for the various features that are sampled by the computing device over time. The computing device may then provide each frame as input to one or more neural networks, which can be configured to determine one or more probabilities for one or more characters and/or character strings. Based on the determined one or more probabilities, the computing device may perform one or more of a variety of operations including, but not limited to, word prediction, auto-correction, and/or suggestion techniques. In some examples, the computing device may output one or more characters or character strings for display based on decoding provided by the one or more neural networks.

Accordingly, techniques of the disclosure may more accurately determine characters and/or character strings that a user of a graphical keyboard intends to enter. As such, techniques of the disclosure may reduce the number of additional user inputs required to achieve accurate text entry using a graphical keyboard. In some instances, these improvements may also improve battery life of a computing device by reducing the number of user inputs otherwise required to correct erroneous interpreted input.

Figure 1:
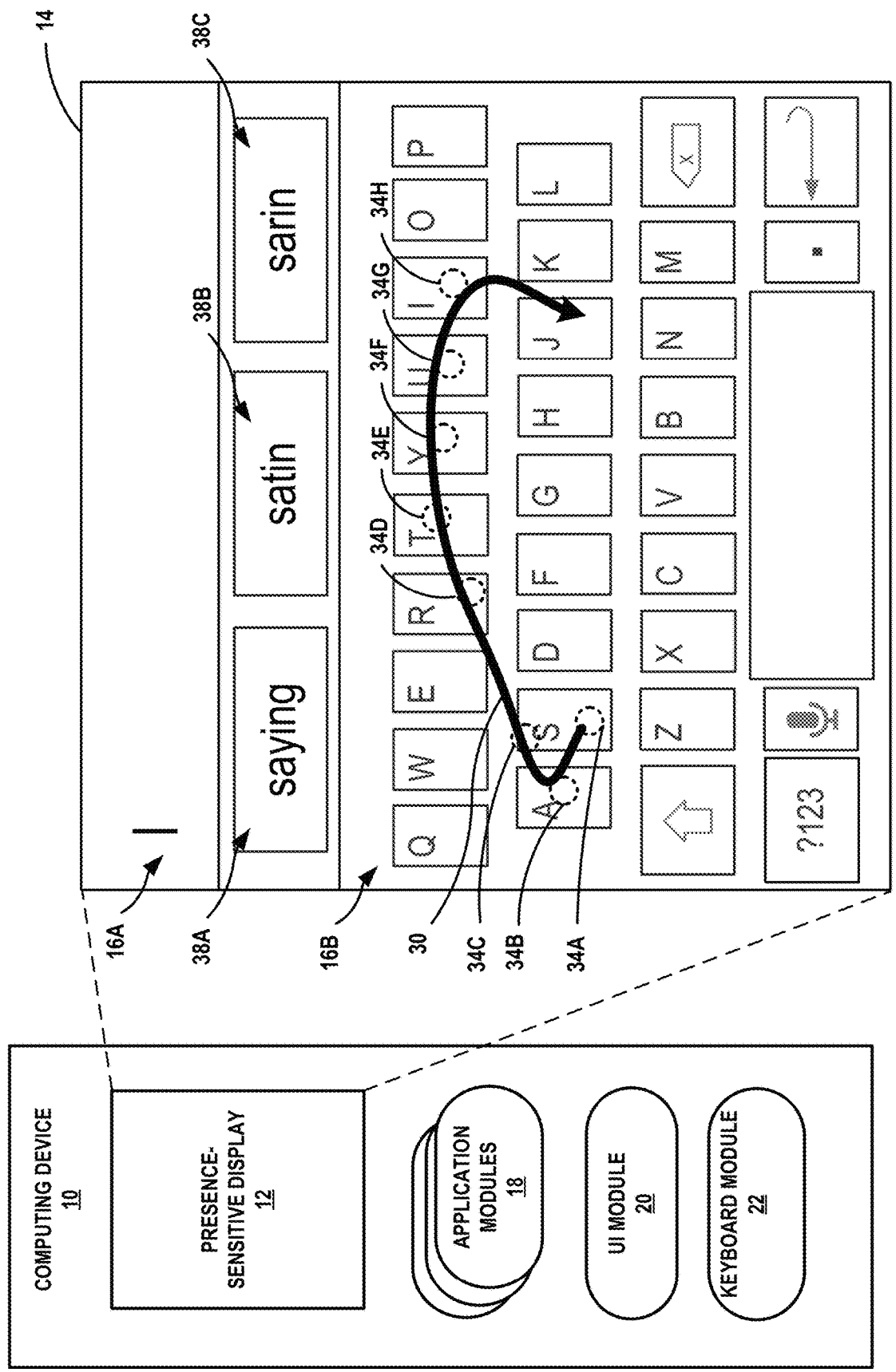
FIG. 1 is a conceptual diagram illustrating an example computing device that is configured to use a neural network to decode user input that is provided at a graphical keyboard, in accordance with one or more aspects of the present disclosure.

FIG. 1 is a conceptual diagram illustrating an example computing device that is configured to use a neural network to decode user input that is provided at a graphical keyboard, in accordance with one or more aspects of the present disclosure. In the example of FIG. 1, computing device 10 may be a mobile phone. However, in other examples, computing device 10 may be a tablet computer, a personal digital assistant (PDA), a laptop computer, a portable gaming device, a portable media player, an e-book reader, a smartwatch, television platform, or another type of computing device.

As shown in FIG. 1, computing device 10 includes presence-sensitive display 12 that is physically integrated with a housing of computing device 10. The housing may in some examples be constructed of plastic, aluminum, steel, or any other suitable material. The housing may be a rigid case that encloses and otherwise protects electrical components that provide the functionality of computing device 10.

Presence-sensitive display 12 of computing device 10 may function as an input device and as an output device for computing device 10. In some examples, presence-sensitive display 12 may include an integrated presence-sensitive input device and a display device. For instance, presence-sensitive display 12 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Presence-sensitive display 12 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to the user of computing device 10. Further details of presence-sensitive display 12 are included in the description of FIG. 2.

Presence-sensitive display 12 may receive indications of the user input by detecting one or more tap and/or non-tap gestures, continuous gestures, or other any touch gestures (e.g., multi-touch gestures) received from a user of computing device 10 (e.g., the user touching or pointing to one or more locations of presence-sensitive display 12 with a finger or a stylus pen). Based on indications of user input, a display device of presence-sensitive display 12 may present output to a user. For instance, a display device of presence-sensitive display 12 may present various user interfaces of applications (e.g., an electronic message application, an Internet browser application,) executing at computing device 10. A user of computing device 10 may provide user input at a presence-sensitive input device of presence-sensitive display 12 to interact with one or more of these applications.

Computing device 10 may include application modules 18, user interface module 20, and keyboard module 22. Modules 18, 20, and 22 may perform operations described herein using software, hardware, firmware, or a mixture of both hardware, software, and firmware residing in and executing on computing device 10 or at one or more other remote computing devices. In some examples, modules 18, 20, and 22 may be implemented as hardware, software, and/or a combination of hardware and software. Computing device 10 may execute modules 18, 20, and 22 with one or more processors. Computing device 10 may execute any of modules 18, 20, and 22 as or within a virtual machine executing on underlying hardware. Modules 18, 20, and 22 may be implemented in various ways. For example, any of modules 18, 20, and 22 may be implemented as a downloadable or pre-installed application or "app." In another example, any of modules 18, 20, and 22 may be implemented as part of an operating system of computing device 10.

As shown in FIG. 1, computing device 10, in some examples, includes one or more application modules 18. Application modules 18 may include functionality to perform any variety of operations on computing device 10. For instance, application modules 18 may include an email application, text messing application, instant messaging application, weather application, video conferencing application, social networking application, weather application, stock market application, emergency alert application, sports application, office productivity application, multimedia player, etc. Although shown as operable by computing device 10, one or more of application modules 18 may be operable by a remote computing device that is communicatively coupled to computing device 10. In such examples, an application module executing at a remote computing device may cause the remote computing device to send the content and intent information using any suitable form of data communication (e.g., wired or wireless network, short-range wireless communication such as Near Field Communication or Bluetooth, etc.). In some examples, a remote computing device may be a computing device that is separate from computing device 10. For instance, the remote computing device may be operatively coupled to computing device 10 by a network. Examples of a remote computing device may include, but is not limited to a server, smartphone, tablet computing device, smart watch, and desktop computer. In some examples, a remote computing device may not be an integrated component of computing device 10.

Computing device 10 may also include UI module 20. UI module 20 of computing device 10 may receive from presence-sensitive display 12, one or more indications of user input detected at presence-sensitive display 12. Generally, each time presence-sensitive display 12 receives an indication of user input detected at a particular location of presence-sensitive display 12, UI module 20 may receive information about the user input from presence-sensitive display 12. UI module 20 may assemble the information received from presence-sensitive display 12 into a set of events, which may be time-ordered, that are indicative of a gesture, such as a sequence of one or more touch events. Each touch event in the sequence may include data or components that represents parameters (e.g., when, where, originating direction) characterizing a presence and/or movement of input at the presence-sensitive screen. Each touch event in the sequence may include a location component corresponding to a location of presence-sensitive display 12, a time component related to when presence-sensitive display 12 detected user input at the location, and/or an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

UI module 20 may determine one or more characteristics of the user input based on the sequence of touch events and include information about these one or more characteristics within each touch event in the sequence of touch events. For example, UI module 20 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). UI module 20 may transmit, as output to keyboard module 22, the sequence of touch events including the components or parameterized data associated with each touch event.

UI module 20 may act as an intermediary between various components of computing device 10 to make determinations based on input detected by presence-sensitive display 12 and generate output presented by presence-sensitive display 12. For instance, UI module 20 may receive, as an input from keyboard module 22, a representation of a keyboard layout of the keys included in graphical keyboard 16B. UI module 20 may receive, as an input from UI module 20, a sequence of touch events generated from information about user input detected by presence-sensitive display 12. UI module 20 may determine, based on the location components in the sequence touch events, that one or more location components approximate a selection of one or more keys (e.g., UI module 20 may determine the location of one or more of the touch events corresponds to an area of presence-sensitive display 12 that presents graphical keyboard 16B). UI module 20 may transmit, as output to keyboard module 22, the sequence of touch events and/or locations where presence-sensitive display 12 presents each of the keys. UI module 20 may also receive, from keyboard module 22, one or more character strings, which may be output for display at presence-sensitive display 12. UI module 20 may update graphical user interface 14 ("GUI 14") to include the one or more character strings. UI module 20 may cause presence-sensitive display 12 to display updated user interface that includes the one or more character strings as text.

In the example of FIG. 1, keyboard module 22 send data to UI module 20 that causes presence-sensitive display 12 to present example user interface 14. In this example, user interface 14 includes graphical elements displayed at various locations of presence-sensitive display 12. FIG. 1 illustrates edit region 16A of user interface 14, and graphical keyboard 16B of user interface 14. Edit region 16A may include graphical elements such as images, objects, hyperlinks, characters of text, etc. Graphical keyboard 16B includes graphical elements displayed as keys. User interface 14 includes suggested character string regions 38A-38C that include selectable spelling corrections or character string suggestions to replace character strings that are included in edit region 16A. In the example of FIG. 1, edit region 16A includes graphical elements displayed as characters of text (e.g., a character string). A user of computing device 10 may enter text in edit region 16A by providing user input at locations of presence-sensitive display 12 that display the keys of graphical keyboard 16B. In response to user input such as this, computing device 10 may output one or more suggested character strings in suggested character string regions 38A-38C.

In some examples, keyboard module 22 of computing device 10 may transmit, as output to UI module 20 (for inclusion as graphical keyboard 16B of GUI 8) a keyboard layout including a plurality of keys related to one or more written languages (e.g., English, Spanish, etc.). Keyboard module 22 may assign one or more characters or operations to each key of the plurality of keys in the keyboard layout. For instance, keyboard module 22 may generate a QWERTY keyboard layout including keys that represent characters used in typing the English language. The QWERTY keyboard layout may also include keys that represent operations used in typing the English language (e.g., backspace, delete, spacebar, enter, etc.).

Keyboard module 22 may receive data from UI module 20 that represents the sequence of touch events generated by UI module 20. Keyboard module 22 may also receive data from UI module 20 that represents locations of presence-sensitive display 12 where presence-sensitive display 12 presents each of the keys of graphical keyboard 16B. Keyboard module 22 may determine, based on the locations of the keys, that the sequence of touch events represents a selection of one or more keys. As further described in this disclosure, keyboard module 22 may use one or more neural networks to determine one or more character strings based on the selection of one or more keys. Keyboard module 22 may send data indicating one or more character strings to UI module 20 for inclusion in user interface 14.

In some examples, keyboard module 22 may use a language model (e.g., language model 28 as further described in FIG. 2) to predict one or more words. Keyboard module 14 may perform a lookup in a language model to identify one or more character strings, e.g., words in language model, that include a part of or all of a group of characters associated with keys corresponding to one or more user inputs, such as continuous gestures and/or discrete tap inputs. The language model may implement one or more n-gram language models. An n-gram language model may provide a probability distribution for an item $x_i$ (letter, word, punctuation character or other delimiter) in a contiguous sequence of items based on the previous items in the sequence (i.e., $P(x_i|x_{i-(n-1)}, \ldots, x_{i-1})$). For instance, a character-level bigram language model (an n-gram model where n=2), may provide a probability that the letter "o" follows the sequence of letters "n". In another example, a word-level trigram language model may provide a probability that "fox" follows the word sequence "quick brown."

A language model of computing device 10 may include a list of character strings, e.g., words, within a written language vocabulary. In some examples, the language model may be based on and/or include a set of character strings based on a dictionary (e.g., that includes a vocabulary of words) stored at computing device 10 or a remote computing device that is accessible by computing device 10. In some examples, the dictionary may include a vocabulary of words. A vocabulary of words may be a body of words used in a written and/or spoken language. A dictionary may be implemented as a data structure that stores one or more words of a vocabulary in a structured manner. The language model may indicate a probability of each respective character string based on the frequency with which the character string occurs in a given language context. For instance, the character string "door" may be more frequently used in the English language following the character string "the" and therefore associated with a larger probability than, for example, the character string "run" following the character string "the."

Keyboard module 14 may use a language model to determine a language model cost for a character string based on a language context that may include, but is not limited to, e.g., a character corresponding to indication of the gesture performed by the user, character strings in a dictionary and/or previously inputted character strings, etc. For example, keyboard module 22 may determine a group of characters associated with keys corresponding to a gesture. The group of characters may be a prefix or portion of a character string. The character string may be included in a language model. Keyboard module 22 may, in some examples, search or "look ahead" to determine one or more character strings in the language model that correspond respectively to the prefix. For instance, given a character string u-t-a, keyboard module 22 may determine, using the language model, the probability of a character string Utah. Keyboard module 22 may determine a language model cost based on the probability. In this way, character strings in language model 22 having higher probabilities in a given language context may have lower language model costs.

Keyboard module 22 may implement techniques of this disclosure that include using a neural network to decode user input that is provided at a graphical keyboard. Rather than using techniques which may perform poorly when the input gestures are noisy or when input is segmented into multiple gestures, techniques of this disclosure may use neural networks which may provide improved recognition of noisy and/or ill-segmented inputs. In particular, keyboard module 22 may implement techniques of the disclosure using recurrent neural networks, which may allow for cycles in a computational graph represented by the neural network. These cycles may allow the neural network to have dynamic contextual windows, as opposed to fixed size windows, used by standard feed forward models when addressing sequential problems. This dynamic window may contribute to improved accuracy for decoding user input that is provided at a graphical keyboard, such as graphical keyboard 16B.

Figure 4:
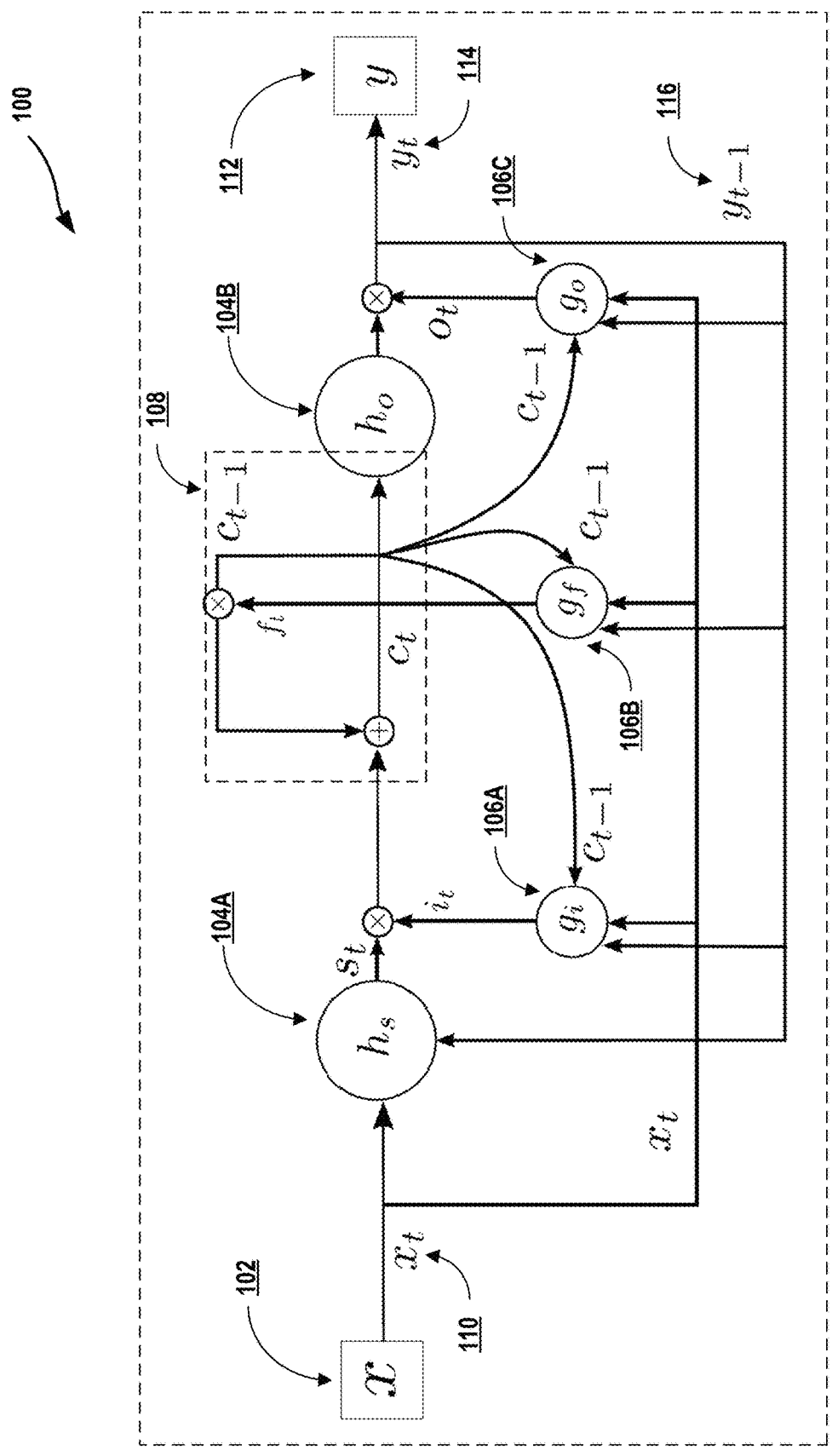
FIG. 4 is a conceptual diagram illustrating a memory block of a Long-Short Term Memory (LSTM) for decoding user input that is provided at a graphical keyboard, in accordance with one or more aspects of the present disclosure.

In general, a neural network implemented by keyboard module 22 may include multiple, interconnected nodes. Each node may apply one or more functions to a set of input values that correspond to one or more features, and provide one or more corresponding output values. In some examples, a node may be an LSTM memory block 100 as shown in FIG. 4. A feature may be any source of data usable by a neural network to decode user input that is provided at a graphical keyboard. In some examples, a feature may be associated with a user input detected by presence-sensitive display 12 for graphical keyboard 16B. In some examples, there may be different types of features, including but not limited to: spatial features, temporal features and lexical features, and contextual features, to name only a few examples. A spatial feature may indicate a spatial property of a gesture. Examples of spatial features may include: location of a gesture, speed of a gesture, direction of a gesture, curvature of a direction, key of a graphical keyboard traversed by the gesture, types of the user inputs (e.g., touch down action or touch up action), to name only a few examples. A temporal feature may indicate a temporal property of the gesture. Examples of temporal features may include an epoch time of the gesture or an international standard notation time of the gesture, to name only a few examples. A lexical feature may indicate language or character set data. Examples of a lexical feature may include one or more characters, character strings, and/or multi-character string phrases, to name only a few examples. A contextual feature may indicate a property of an input context, wherein an input context may be a setting or state of information prior to, during, and/or after determining the gesture. Examples of contextual features may include an identity of a user of the computing device, a geolocation of the computing device, an environment and/or climate of the computing device, audio and/or visual information determined by the computing device, sensor information detected by the computing device, type of input field for which text is entered by user, application for which text is entered by user, recipient of text entered by user, to name only a few examples.

In some examples, the one or more corresponding output values of the neural network may include one or more characters and/or character strings. The one or more output values may, in some examples, include probabilities of the one or more characters or character strings. Accordingly, keyboard module 22 may use the neural network to determine probabilities of characters and/or character strings based on the features of the user input, and determine the characters and/or character strings that are mostly likely intended by the user based on the corresponding probabilities. As further described in this disclosure, the neural network may be trained by keyboard module 12 to more accurately determine the one or more characters and/or character strings based on features corresponding to user inputs that are detected by presence-sensitive display 12. For instance, the neural network may include one or more learnable parameters or "weights" that are applied to the features. Keyboard module 22 may adjust these learnable parameters during the training to improve the accuracy with which the neural network determines characters and/or character strings that are intended by the user. For example, based on the degree to which the actual output value provided by the neural network deviates from an expected output value from a training set, keyboard module 22 may adjust a learnable parameter. In some examples, the greater the degree of deviation between the actual output value and the expected value from the training set, the greater the adjustment that keyboard module 22 will apply to the learnable parameter.

Although any suitable neural network may be used by keyboard module 22, some recurrent neural networks may perform better than others. For instance, some recurrent neural networks may experience gradient vanishing and/or explosion problems. Long Short Term Memories (LSTMs), which are an example of recurrent neural networks, may address these potential problems through a memory block containing a memory cell which has a self-connection storing the temporal state of the network. Examples of LSTMs are further described in FIGS. 2-7 of this disclosure.

LSTMs may improve the accuracy with which keyboard module 22 determines characters and/or character strings based on user inputs at a graphical keyboard by allowing a steady gradient during training.

For example purposes, the techniques for using a neural network to decode user input are further described in detail with reference to FIG. 1. In the example of FIG. 1, computing device 10 outputs for display graphical keyboard 16B comprising a plurality of keys. For example, keyboard module 22 may generate data that includes a representation of graphical keyboard 16B. UI module 20 may generate user interface 14 and include graphical keyboard 16B in user interface 14 based on the data representing graphical keyboard 16B. UI module 20 may send information to presence-sensitive display 12 that includes instructions for displaying user interface 14 at a presence-sensitive screen of presence-sensitive display 12. Presence-sensitive display 12 may receive the information and cause the presence-sensitive screen of presence-sensitive display 12 to present user interface 14 including edit region 16A, graphical keyboard 16B, and suggested character string regions 38A-38C.

Computing device 10 may receive an indication of a gesture detected at a location of a presence-sensitive input device, wherein the location of the presence-sensitive input device corresponds to a location of the presence-sensitive input device that outputs the graphical keyboard 16B. In some examples, the gesture may be a single-tap gesture in which a user's finger is detected a particular location of presence-sensitive display 12 and is subsequently no longer detected by presence-sensitive display 12 upon the user removing the finger from detection by presence-sensitive display 12, and without the user's finger traversing to a different location of presence-sensitive display 12 in the same gesture. In some examples, the gesture may be a continuous gesture in which the user's finger is detected a first location of the presence, and while the user's finger remains detected by presence-sensitive display 12, the user's finger is detected at one or more locations that are different from the first location (e.g., the user's finger is sliding or otherwise traversing multiple locations of presence-sensitive display 12) before the user removes the finger from detection by presence-sensitive display 12. In some examples, the gesture may be a portion of a larger continuous gesture. In some examples, the gesture may be an entire, complete continuous gesture from the moment the user's finger is detected by presence-sensitive display 12 until the moment the user's finger is no longer detected by presence-sensitive display 12.

For example, as presence-sensitive display 12 presents user interface 14 at the presence-sensitive screen, a user may provide gesture user input 30 (or simply "gesture" 30) at a region of presence-sensitive display 12 that presents graphical keyboard 16B. FIG. 1 illustrates a path of gesture 30 that traverses locations 34A-34H of presence-sensitive display 12. For example, location 34A represents a beginning location of gesture 30 and locations 34B-34H represent additional locations of presence-sensitive display 12 traversed by gesture 30. Each of locations 34 are delimited by dashed circles in FIG. 1 for example purposes, although presence-sensitive display 12 may not output such dashed circles in some examples, and such locations may be larger and/or smaller in various different examples.

As gesture 30 is being detected by presence-sensitive display 12, UI module 20 may be receiving information indicating gesture 30 from presence-sensitive display 12 and assembling the information into a time-ordered sequence of touch events (e.g., each touch event including a location component, a time component, and an action component). UI module 20 may send the touch events to keyboard module 22. Keyboard module 22 may receive the sequence of touch events along with the information associated with each touch event (e.g., location, time, action, etc.) from UI module 20. That is, UI module 20 may contemporaneously generate the touch events as gesture 30 is detected and send the touch events to keyboard module 22. Accordingly, in some examples, keyboard module 22 may receive time-sampled data that is representative of the touch events.

In accordance with techniques of the disclosure, keyboard module 22 may determine, based on at least one spatial feature of the gesture that is processed by computing device 10 using a neural network, at least one character string. In some examples, keyboard module 22 may generate "frames" of input values corresponding to spatial features. For instance, in the example of FIG. 1, the spatial features may include: an (x,y) coordinate of a location traversed by gesture 30, a key of graphical keyboard 16B that includes the location, a time at which the location was traversed (e.g., when the touch event that includes the (x,y) coordinate was generated), and a particular type of gesture. The input values for the spatial features may include the value of the (x,y) coordinate, an identifier of the key (e.g., the character associated with the key), a value representing the time at which the location was traversed, and an identifier of the type of gesture. The input values of the spatial features at a particular point in time may be structured in a "frame," which may be a column vector (e.g., column matrix) of an input matrix. For instance, each column of the input matrix may represent a set of input values for the spatial features as sampled over time, the rows of the input matrix may represent the different spatial features, and a cell in the input matrix may include an input value of a particular feature at a particular time. In some examples, a matrix in this disclosure may be implemented as a multi-dimensional array or other suitable data structure.

As keyboard module 22 generates the frames of input values for the spatial features in response to touch events that are generated over time as gesture 20 is performed, keyboard module 22 may input the input values of each frame into a neural network that is used by keyboard module 22. In some examples, each frame is inputted into the neural network in the time-ordered sequence in which the frame is generated by keyboard module 22 in response to the corresponding touch events. Accordingly, keyboard module 22 may, continuously input the frames input the neural network as the frames are generated by keyboard module 22.

As the neural network used by keyboard module 22 receives the input values, the neural network may compute one or more functions based at least in part on the input values an inputted frame, and provide one or more corresponding output values. Further details of the computations of the functions are described in FIGS. 2-7. In some examples, the neural network used by keyboard module 22 may generate one or more probabilities of one or more characters based on one or more input values. To illustrate with reference to FIG. 1, a particular frame may correspond to a touch event generated in response to detecting gesture 30 at location 34H. The input values of the particular frame may include an (x,y) coordinate of location 34H, a value of "I" that identifies the "I" key of graphical keyboard 16B, a time at which the touch event was generated, and an identifier of a input type of gesture 30 at location 43H. Based on the input values of this particular frame, the neural network used by keyboard module 22 may generate one or more probabilities of one or more characters. For instance, the neural net may indicate a probability of 0.8 for the character "I," a probability of 0.05 for the character "U," a probability of 0.05 for the character "O," a probability of 0.05 for the character "J," and a probability of 0.05 for the character "K." The output values of the neural network may be structured in a column vector (e.g., column matrix) of an output matrix. For instance, each column of the output matrix may represent a set of probabilities for respective characters based on a respective frame that is input to the neural network. The rows of the matrix may represent different characters of a character set, and a cell in the matrix may include a probability of a particular character for the respective frame that was input into the neural network.

As keyboard module 22 inputs frames of input values for the spatial features into the neural network, keyboard module 22 may output the probabilities of characters for each respective input frame. In some examples, each column vector of the output matrix is generated from the neural network in the time-ordered sequence in which the corresponding, respective frame is inputted into the neural network by keyboard module 22 in response to the corresponding touch events. Accordingly, keyboard module 22 may, continuously output column vectors of the output matrix as the neural network as the frames are input into the neural network used by keyboard module 22.

Keyboard module 22 may determine one or more character strings based on the output of the neural network. For instance, keyboard module 22 may model the probabilities of the characters for each respective column vector of the output matrix in a data structure, and determine which character strings have higher probabilities than other character strings. As further described in FIG. 5, keyboard module 22 may generate a graph in which the probability of a character in a column vector of an output matrix is represented by an edge of a graph. Accordingly, as keyboard module 22 generates output column vectors, the probabilities of characters are modeled on successive edges of the graph, and paths through the graph from a starting node to a terminal node may represent character strings. In some examples, keyboard module 22 may use a language model incorporate a probability into the graph of a character string for a particular input context, as further described in FIG. 5. By determining overall probabilities or "costs" of differing paths that originate from the starting node and end at the terminal node, keyboard module 22 may determine which character strings that correspond to the respective paths are more probable than others. In this way, paths that are more probable or have lower "costs" may indicate character strings that are more likely intended by the user that performed gesture 30.

Keyboard module 22 may determine combined costs or combined probabilities for one or more character strings that are determined based on the outputs of the neural network. The combined costs or combined probabilities may indicate the respective likelihoods that the character strings corresponds to gesture 30. For instance, in the example of FIG. 1, keyboard module 22 may determine respective, combined costs or combined probabilities for the character strings "saying," "satin," and "sarin." Keyboard module 22 may also determine combined costs or combined probabilities for character strings in addition to "saying," "satin," and "sarin." Based on the determined one or more combined costs or combined probabilities, keyboard module 22 may perform one or more of a variety of operations including, but not limited to, word prediction, auto-correction, and/or suggestion techniques.

In some examples, computing device 10 may output one or more characters or character strings for display based on decoding provided by the neural network. For instance, keyboard module 22 send data to UI module 20 which causes presence-sensitive display 12 to output, based at least in part on the processing of the at least one spatial feature of the gesture using the neural network, at least one character string. In some examples, keyboard module 22 may output one or more character strings in character string suggestion regions 38A-38C. As shown in FIG. 1, the three character strings with the highest combined probabilities may be output for display in suggested character string regions 38A-38C. In the example of FIG. 1, the combined cost associated with the character string "satin" may be the lowest combined cost, followed by "sarin," and then "saying." In some examples, one or more character strings may be output for display in edit region 16A and/or at graphical keyboard 16B.

In some examples, UI module 20 may update suggested character string regions 38A-38C by including the three highest ranking candidate character strings as suggested character strings, as gesture 30 is being performed by a user. From user interface 14, the user can select one of suggested character strings 38 by tapping or providing an input at a location of presence-sensitive display 12 where presence-sensitive display 12 outputs suggested character string regions 38A-38C. For example, the user may select a suggested character string region by tapping or gesturing over the location of presence-sensitive display 12 where presence-sensitive display 12 presents a suggested character string, e.g., "satin." Selecting suggested character string region 38A may cause UI module 20 to update user interface 14 and include character string "satin" in edit region 16A.

In this way, the techniques of the disclosure may more accurately determine the characters and/or character strings intended by a user when using graphical keyboard 14. As such, the techniques of the disclosure may reduce the number of additional user inputs, and therefore wear-and-tear on the device, that would otherwise be required by a user to correct erroneously interpreted input. In some instances, techniques of the disclosure may improve the efficiency of text input at a graphical keyboard, which may also improve battery life by reducing the number of user inputs otherwise required to correct erroneous interpreted input.

Figure 2:
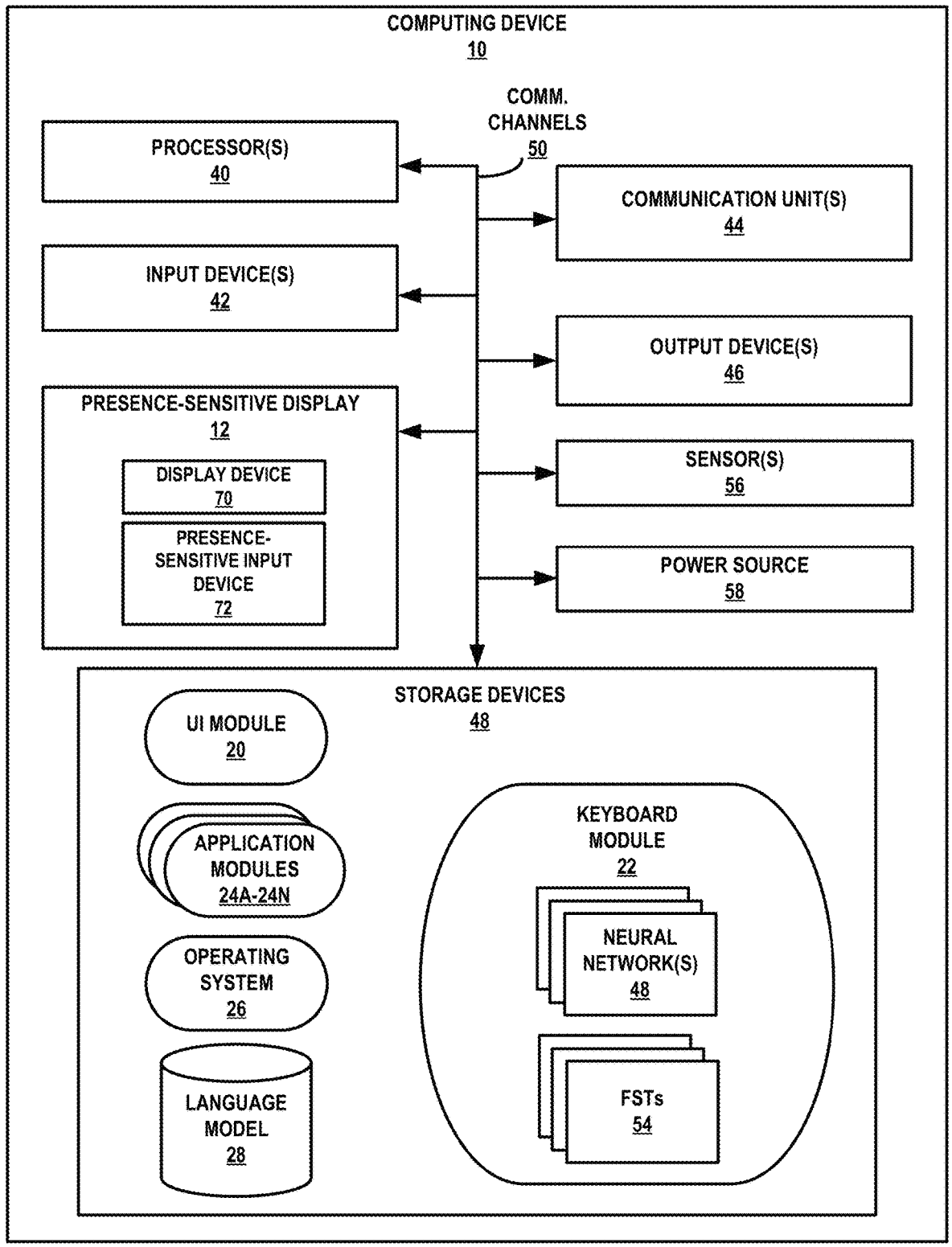
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 10 (as also illustrated in FIG. 1), and many other examples of computing device 10 may be used in other instances and may include a subset of the components included in example computing device 10 and computing device 10 or may include additional components not shown in FIG. 2.

As shown in the example of FIG. 2, computing device 10 includes one or more processors 40, one or more input devices 42, one or more communication units 44, one or more output devices 46, one or more storage devices 48, and presence-sensitive display 12. Storage devices 48 of computing device 10 also include UI module 20, application modules 24A-24N, operating system 26, language module 28, and keyboard module 22. Keyboard module 22 may also include one or more neural networks 52 and one or more finite state transducers 54. Neural networks 52 may include one or more neural networks to decode user input at a graphical keyboard, and may include memory block 100 of FIG. 4. FSTs 54 may include one or more FSTs to decode user input at a graphical keyboard, and may include FST 150 of FIG. 5. Communication channels 50 may interconnect each of the components 12, 40, 42, 44, 46, 48, 56, 58, 70, and 72 for inter-component communications (physically, communicatively, and/or operatively). In some examples, communication channels 50 may include a system bus, a network connection, one or more inter-process communication data structures, or any other components for communicating data between hardware and/or software.

One or more processors 40 may implement functionality and/or execute instructions within computing device 10. For example, processors 40 on computing device 10 may receive and execute instructions stored by storage devices 48 that provide the functionality of UI module 20, application modules 24, operating system 26, language model 28 and keyboard module 22 (including neural networks 52 and finite state transducers 54). These instructions executed by processors 40 may cause computing device 10 to store and/or modify information, within storage devices 48 during program execution. Processors 40 may execute instructions of UI module 20, application modules 24, operating system 26, language model 28 and keyboard module 22 (including neural networks 52 and finite state transducers 54) to perform one or more operations. That is, UI module 20, application modules 24, operating system 26, language model 28 and keyboard module 22 (including neural networks 52 and finite state transducers 54) may be operable by processors 40 to perform various functions described herein.

One or more input devices 42 of computing device 10 may receive input. Examples of input are tactile, audio, kinetic, and optical input, to name only a few examples. Input devices 42 of computing device 10, in one example, include a mouse, keyboard, voice responsive system, video camera, buttons, control pad, microphone or any other type of device for detecting input from a human or machine. In some examples, input device 42 may be a presence-sensitive input device, which may include a presence-sensitive screen, touch-sensitive screen, etc.

One or more output devices 46 of computing device 10 may generate output. Examples of output are tactile, audio, and video output. Output devices 46 of computing device 10, in one example, include a presence-sensitive screen, sound card, video graphics adapter card, speaker, cathode ray tube (CRT) monitor, liquid crystal display (LCD), or any other type of device for generating output to a human or machine. Output devices 46 may include display devices such as cathode ray tube (CRT) monitor, liquid crystal display (LCD), Light-Emitting Diode (LED) or any other type of device for generating tactile, audio, and/or visual output.

In some examples, presence-sensitive display 12 of computing device 10 may include functionality of input devices 42 and/or output devices 46. In the example of FIG. 2, presence-sensitive display 12 may include a presence-sensitive input device 72, such as a presence-sensitive screen or touch-sensitive screen. In some examples, presence-sensitive input device 72 may detect an object at and/or near the presence-sensitive input device. As one example range, presence-sensitive input device 72 may detect an object, such as a finger or stylus that is within 2 inches or less of presence-sensitive input device 72. Presence-sensitive input device 72 may determine a location (e.g., an (x,y) coordinate) of the presence-sensitive input device at which the object was detected. In another example range, presence-sensitive input device 72 may detect an object 6 inches or less from presence-sensitive input device 72 and other ranges are also possible. Presence-sensitive input device 72 may determine the location of presence-sensitive input device 72 selected by a user's finger using capacitive, inductive, and/or optical recognition techniques.

In some examples, presence-sensitive display 12 may also provide output to a user using tactile, audio, or video stimuli as described with respect to output device 46. For instance, presence-sensitive display 12 may include display device 70 that presents a graphical user interface. Display device 70 may be any type of output device that provides visual output, such as described with respect to output devices 46. While illustrated as an integrated component of computing device 10, presence-sensitive display 12 may, in some examples, be an external component that shares a data path with other components of computing device 10 for transmitting and/or receiving input and output. For instance, presence-sensitive display 12 may be a built-in component of computing device 10 located within and physically connected to the external packaging of computing device 10 (e.g., a screen on a mobile phone). In another example, presence-sensitive display 12 may be an external component of computing device 10 located outside and physically separated from the packaging of computing device 10 (e.g., a monitor, a projector, etc. that shares a wired and/or wireless data path with a tablet computer). In some examples, presence-sensitive display 12, when located outside of and physically separated from the packaging of computing device 10, may be implemented by two separate components: a presence-sensitive input device 72 for receiving input and a display device 70 for providing output.

One or more communication units 44 of computing device 10 may communicate with external devices by transmitting and/or receiving data. For example, computing device 10 may use communication units 44 to transmit and/or receive radio signals on a radio network such as a cellular radio network. In some examples, communication units 44 may transmit and/or receive satellite signals on a satellite network such as a Global Positioning System (GPS) network. Examples of communication units 44 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers and the like.

One or more storage devices 48 within computing device 10 may store information for processing during operation of computing device 10. In some examples, storage device 48 is a temporary memory, meaning that a primary purpose of storage device 48 is not long-term storage. Storage devices 48 on computing device 10 may configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM)

memories. Storage devices 48 may store program instructions and/or data associated with UI module 20, application modules 24, operating system 26, language model 28 and keyboard module 22.

As shown in FIG. 2, computing device 10 may include one or more sensors 56. Sensors 56 may include an accelerometer that generates accelerometer data. Accelerometer data may indicate an acceleration and/or a change in acceleration of computing device 10. Sensors 56 may include a gyrometer that generates gyrometer data. Gyrometer data may indicate a physical orientation and/or change in physical orientation of computing device 10. In some examples, the orientation may be relative to one or more reference points. Sensors 56 may include a magnetometer that generates magnetometer data. Magnetometer data may indicate the magnetization of an object that is touching or in proximity to computing device 10. Magnetometer data may indicate the Earth's magnetic field, and in some examples, provide directional functionality of a compass. Sensors 56 may include an ambient light sensor that generates ambient light data. The ambient light data may indicate an intensity of light to which computing device 10 is exposed. Sensors 56 may include a proximity sensor that generates proximity data. Proximity data may indicate whether an object is within proximity to computing device 56. In some examples, proximity data may indicate how close an object is to computing device 10. In some examples, sensors 56 may include a clock that generates a date and time. The date and time may be a current date and time.

As shown in FIG. 2, computing device 10 may include a power source 58. In some examples, power source 58 may be a battery. Power source 58 may provide power to one or more components of computing device 10. Examples of power source 58 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. In some examples, power source 58 may have a limited capacity (e.g., 1000-3000 mAh).

In accordance with techniques of the disclosure, computing device 10 may include one or more processors 40 and at least one keyboard module 22, operable by one or more processors processor 40 to output, for display at display device 70, a graphical keyboard. One or more processor 40 may receive an indication of a gesture detected at a location of presence-sensitive input device 72, wherein the location of presence-sensitive input device 72 corresponds to a location of the display device 70 that outputs the graphical keyboard. One or more processors 40 may determine, based on at least one spatial feature of the gesture that is processed by computing device 10 using a neural network of neural networks 48, at least one character string, wherein the at least one spatial feature indicates at least one physical property of the gesture. One or more processors 40 may output, for display at display device 70, based at least in part on the processing of the at least one spatial feature of the gesture using the neural network of neural networks 48, the at least one character string.

In some instances there may be multiple modes of input on touch screen keyboard. One is tapping (or touch typing), character by character, augmented with word completion, next word prediction, and error correction. Another mode may be gesture typing (also known as word-gesture keyboard, swipe keyboard, or shape writing). Instead of tapping character by character, gesture typing lets the user to slide a finger or stylus on the touch screen keyboard to enter one word (or more, or subwords) at a time. In both modes, error tolerance may improve the user experience. The more error tolerant, the more rapid, sloppy, and effortless the user can be when inputting text. Techniques of the disclosure may provide more error tolerance to further relax the user's input precision as well as behavior. For example the user may able to gesture multiple short words such as "it is", both of which may tend to be error prone because they are short if the user choose to do so. In some examples, techniques of the disclosure may enable a user to freely separate a long word to multiple parts, each entered with a different stroke. In some examples, each different stroke may be disjoint. Techniques of the disclosure may also enable a user to gesture with two thumbs, to take advantage of the alternating nature of the Qwerty layout. In some examples, techniques of the disclosure may enable a user to mix gesture typing with touch typing within a word.

Rather than using models with explicit features to calculate word candidate probabilities, techniques of the disclosure may use one or more artificial neural networks that are trained on keyboard spatial input data and their corresponding text, among other possible data. The paired input data and text may be obtained by computing device 10 through product logging or data collection trials. The pairing can be on word, character (including Chinese character zi), phrase, or paragraph level.

In some examples, keyboard decoding may be understood as a process of inferencing the user intended text from spatial and/or lexical inputs that may have one or more sources of noise. For instance, one source of noise is the spatial-motor noise due to the user's inability to precisely touch or gesture on screen aimed at each and every letter in the intended word. The user could also inadvertently express additional letters or omit some letters. A second source of noise may be cognitive errors due to, for example, incorrectly spelling the intended word. These two types of errors, or costs, may be calculated against language model predictions. Other factors, such as timing and rhythm of the spatial input, could also be factored in the calculation. Techniques of the disclosure implemented by keyboard 22 may improve the keyboard decoding process by making the process more error tolerant to such sources of noise.

In some examples, an artificial neural network, in accordance with techniques of this disclosure, can be a direct model trained on data containing all these factors including but not limited to temporal, spatial, spelling when entering natural sentences (so the degree of fitting regular language expressions are included in the data). When data is limited, separate artificial network networks, for temporal-spatial modeling, for spelling modelling, and for language modelling, can be trained on different corpora and then combined. This artificial neural network approach may provide a more integrated and/or more optimized approach to touch screen keyboard decoding.

The artificial neural network architecture implemented by keyboard module 22 may be varied for keyboard decoding. Recurrent neural networks, such as LSTM recurrent neural networks as described in this disclosure may be implemented by keyboard module 22 for keyboard input decoding. Neural networks 48 may have either a single or multiple hidden layers as further discussed in FIG. 6. Neural networks 48 may be either unidirectional (early context affect later results) or bidirectional (later context affect early results).

Figure 5:
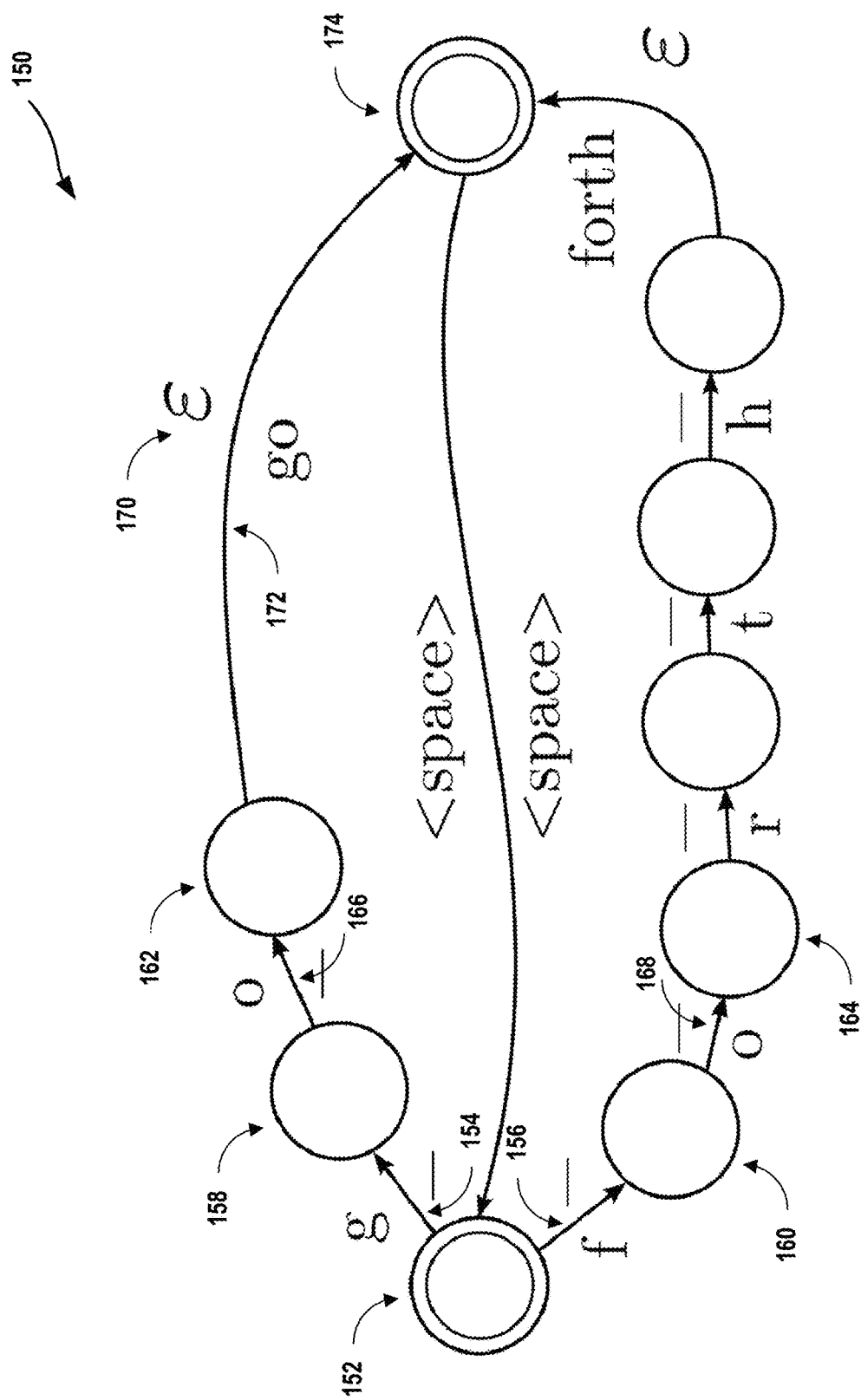
FIG. 5 is a conceptual diagram illustrating a Finite State Transducer for modeling probabilities of character sequences output by a neural network, in accordance with one or more aspects of the present disclosure.

In some examples, an LSTM artificial neural network may map spatial inputs to character strings which are then connected with a traditional language model, such as further described in FIGS. 4-5. In some examples the spatial input, being touch tap sequences or gesture strokes, can contain cognitive spelling errors, so a neural network implemented by keyboard 22 may learn common misspellings. As further described in FIG. 5, techniques of the disclosure may implement language module 28 as an artificial neural network, such as an LSTM artificial neural network. LSTM language models may capture broader context than preceding N (e.g. 2) words.

In some examples, keyboard module 22 may implement a deep network that is trained on longer input sequences corresponding to phrases and sentences. A deep network may be a network that includes a quantity of layers that satisfies a threshold value (e.g., is greater than a threshold value). Such a deep network may reflect both language and spatial models.

As described in this disclosure, keyboard module 22 may train network networks 48 based on training data. Keyboard module 22 may collect training data through logging or more dedicated data collection exercises provided by keyboard module 22 in which a human user types, by touching or by gesturing, prompted text (words, phrases, or sentences) so natural human spatial input containing naturally occurring errors of various kinds mentioned earlier are associated with the promoted (labelled) text. In some examples, when data is limited, particularly for training larger artificial network networks of neural networks 48 that model both temporal-spatial regularities and language regularities at the same time, synthetic data can be used in training. Touch or gesture synthesizers implemented by keyboard module 22 may model and extrapolate smaller amount of human spatial data to larger number of and unknown words, which in turn can be combined with real recorded text (e.g emails) that reflect the target applications of keyboard such as email, sms, social networks and blog postings.

Techniques of the disclosure may provide more flexible and more accurate keyboard decoding. For instance, techniques of the disclosure may perform more accurately at for unforeseen or unanticipated user input scenarios, for which conventional techniques/implementations are not designed. For example some users may gesture "It is" with one stroke, while others may break a long word into multiple strokes. Techniques of the disclosure may be more flexible to determine the word or words intended by the user. As another example, a user may mix gesture and tap, or gesture and tap by two thumbs alternatively. While conventional techniques may have to be specifically designed for such user scenarios, techniques of this disclosure using one or more artificial neural networks may be trained to learn these cases, thereby providing greater adaptability to user input techniques. Such training data may be collected or generated by keyboard module 22 as described in this disclosure. Using artificial network networks, keyboard module 22 may also decode numerous different input patterns (e.g. those of bimanual gesture typing). As such, keyboard module 22 may implement artificial neural network functions using features based on examples in training rather than by hardcoded feature engineering.

Figure 3:
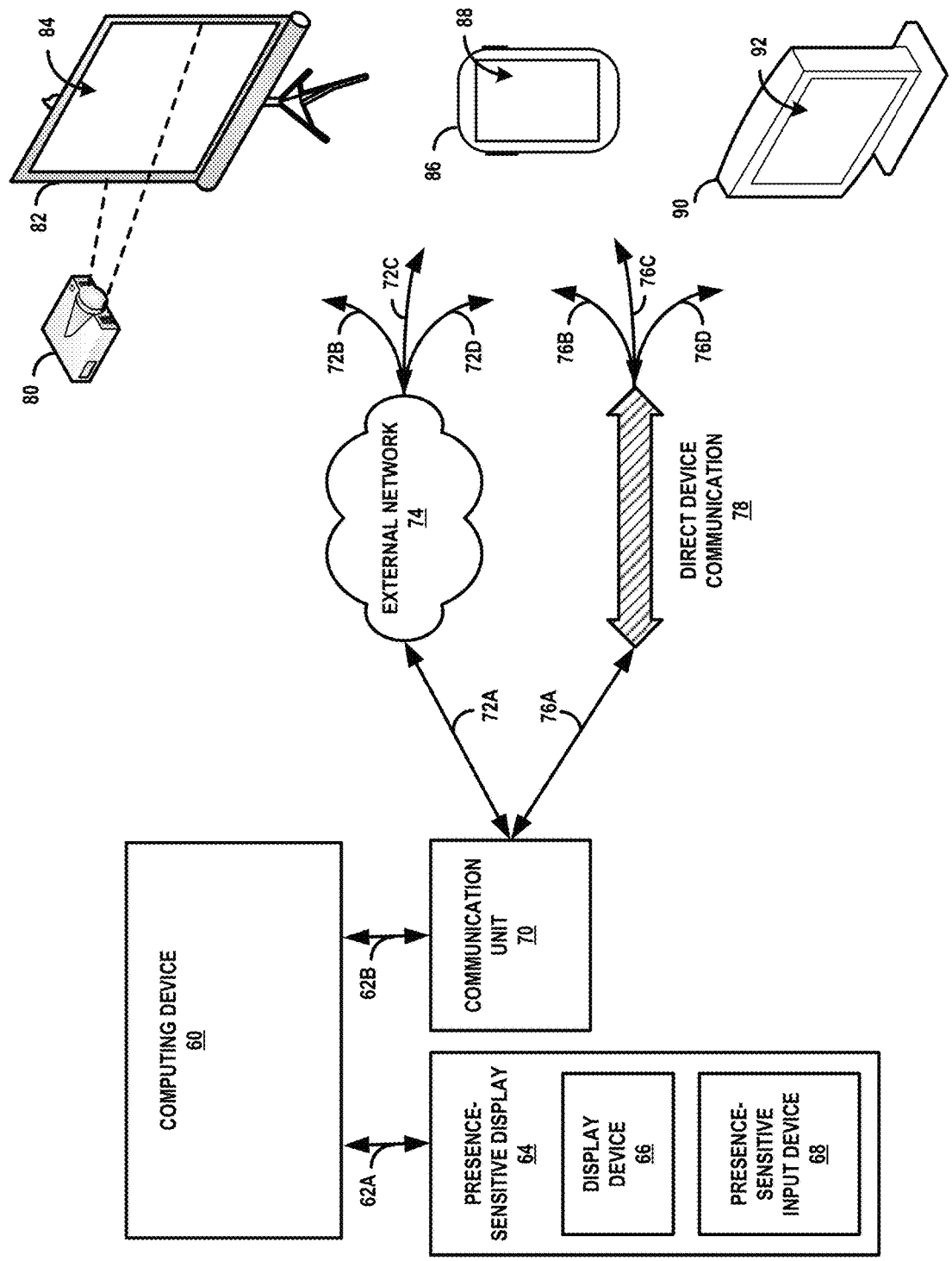
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, to name only a few examples. The example shown in FIG. 3 includes a computing device 60, a presence-sensitive display 64, communication unit 70, projector 80, projector screen 82, mobile device 86, and visual display device 90. In some examples, presence-sensitive display 64 may be a presence-sensitive display as described in FIGS. 1-2. Although shown for purposes of example in FIGS. 1 and 2 as a stand-alone computing device 10, a computing device such as computing device 60 may, generally, be any component or system that includes a processor or other suitable computing environment for executing software instructions and, for example, need not include a presence-sensitive display.

As shown in the example of FIG. 3, computing device 60 may be a processor that includes functionality as described with respect to processors 40 in FIG. 2. In such examples, computing device 60 may be operatively coupled to presence-sensitive display 64 by a communication channel 62A, which may be a system bus or other suitable connection. Computing device 60 may also be operatively coupled to communication unit 70, further described below, by a communication channel 62B, which may also be a system bus or other suitable connection. Although shown separately as an example in FIG. 3, computing device 60 may be operatively coupled to presence-sensitive display 64 and communication unit 70 by any number of one or more communication channels.

In other examples, such as illustrated previously by computing device 10 in FIGS. 1-2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

Presence-sensitive display 64, may include display device 66 and presence-sensitive input device 68. Display device 66 may, for example, receive data from computing device 60 and display the graphical content. In some examples, presence-sensitive input device 68 may determine one or more user inputs (e.g., continuous gestures, multi-touch gestures, single-touch gestures) at presence-sensitive display 64 using capacitive, inductive, and/or optical recognition techniques and send indications of such user input to computing device 60 using communication channel 62A. In some examples, presence-sensitive input device 68 may be physically positioned on top of display device 66 such that, when a user positions an input unit over a graphical element displayed by display device 66, the location at which presence-sensitive input device 68 corresponds to the location of display device 66 at which the graphical element is displayed.

As shown in FIG. 3, computing device 60 may also include and/or be operatively coupled with communication unit 70. Communication unit 70 may include functionality of communication unit 44 as described in FIG. 2. Examples of communication unit 70 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 60 may also include and/or be operatively coupled with one or more other devices (e.g., input devices, output devices, memory, storage devices) that are not shown in FIG. 3 for purposes of brevity and illustration.

FIG. 3 also illustrates a projector 80 and projector screen 82. Other such examples of projection devices may include electronic whiteboards, holographic display devices, and any other suitable devices for displaying graphical content. Projector 80 and projector screen 82 may include one or more communication units that enable the respective devices to communicate with computing device 60. In some examples, the one or more communication units may enable communication between projector 80 and projector screen 82. Projector 80 may receive data from computing device 60 that includes graphical content. Projector 80, in response to receiving the data, may project the graphical content onto projector screen 82. In some examples, projector 80 may determine one or more user inputs (e.g., continuous gestures, multi-touch gestures, single-touch gestures) at projector screen using optical recognition or other suitable techniques and send indications of such user input using one or more communication units to computing device 60. In such examples, projector screen 82 may be unnecessary, and projector 80 may project graphical content on any suitable medium and detect one or more user inputs using optical recognition or other such suitable techniques.

Projector screen 82, in some examples, may include a presence-sensitive display 84. Presence-sensitive display 84 may include a subset of functionality or all of the functionality of presence-sensitive display 4 and/or 64 as described in this disclosure. In some examples, presence-sensitive display 84 may include additional functionality. Projector screen 82 (e.g., an electronic whiteboard), may receive data from computing device 60 and display the graphical content. In some examples, presence-sensitive display 84 may determine one or more user inputs (e.g., continuous gestures, multi-touch gestures, single-touch gestures) at projector screen 82 using capacitive, inductive, and/or optical recognition techniques and send indications of such user input using one or more communication units to computing device 60.

FIG. 3 also illustrates mobile device 86 and visual display device 90. Mobile device 86 and visual display device 90 may each include computing and connectivity capabilities. Examples of mobile device 86 may include e-reader devices, convertible notebook devices, hybrid slate devices, etc. Examples of visual display device 90 may include other semi-stationary devices such as televisions, computer monitors, etc. As shown in FIG. 3, mobile device 86 may include a presence-sensitive display 88. Visual display device 90 may include a presence-sensitive display 92. Presence-sensitive displays 88, 92 may include a subset of functionality or all of the functionality of presence-sensitive display 4 and/or 64 as described in this disclosure. In some examples, presence-sensitive displays 88, 92 may include additional functionality. In any case, presence-sensitive display 92, for example, may receive data from computing device 60 and display the graphical content. In some examples, presence-sensitive display 92 may determine one or more user inputs (e.g., continuous gestures, multi-touch gestures, single-touch gestures) at projector screen using capacitive, inductive, and/or optical recognition techniques and send indications of such user input using one or more communication units to computing device 60.

As described above, in some examples, computing device 60 may output graphical content for display at presence-sensitive display 64 that is coupled to computing device 60 by a system bus or other suitable communication channel. Computing device 60 may also output graphical content for display at one or more remote devices, such as projector 80, projector screen 82, mobile device 86, and visual display device 90. For instance, computing device 60 may execute one or more instructions to generate and/or modify graphical content in accordance with techniques of the present disclosure. Computing device 60 may output the data that includes the graphical content to a communication unit of computing device 60, such as communication unit 70. Communication unit 70 may send the data to one or more of the remote devices, such as projector 80, projector screen 82, mobile device 86, and/or visual display device 90. In this way, computing device 60 may output the graphical content for display at one or more of the remote devices. In some examples, one or more of the remote devices may output the graphical content at a presence-sensitive display that is included in and/or operatively coupled to the respective remote devices.

In some examples, computing device 60 may not output graphical content at presence-sensitive display 64 that is operatively coupled to computing device 60. In other examples, computing device 60 may output graphical content for display at both a presence-sensitive display 64 that is coupled to computing device 60 by communication channel 62A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 60 and output for display at presence-sensitive display 64 may be different than graphical content display output for display at one or more remote devices.

Computing device 60 may send and receive data using any suitable communication techniques. For example, computing device 60 may be operatively coupled to external network 74 using network link 72A. Each of the remote devices illustrated in FIG. 3 may be operatively coupled to network external network 74 by one of respective network links 72B, 72C, or 72D. External network 74 may include network hubs, network switches, network routers, etc., that are operatively inter-coupled thereby providing for the exchange of information between computing device 60 and the remote devices illustrated in FIG. 3. In some examples, network links 72A-72D may be Ethernet, ATM or other network connections. Such connections may be wireless and/or wired connections.

In some examples, computing device 60 may be operatively coupled to one or more of the remote devices included in FIG. 3 using direct device communication 78. Direct device communication 78 may include communications through which computing device 60 sends and receives data directly with a remote device, using wired or wireless communication. That is, in some examples of direct device communication 78, data sent by computing device 60 may not be forwarded by one or more additional devices before being received at the remote device, and vice-versa. Examples of direct device communication 78 may include Bluetooth, Near-Field Communication, Universal Serial Bus, WiFi, infrared, etc. One or more of the remote devices illustrated in FIG. 3 may be operatively coupled with computing device 60 by communication links 76A-76D. In some examples, communication links 76A-76D may be connections using Bluetooth, Near-Field Communication, Universal Serial Bus, infrared, etc. Such connections may be wireless and/or wired connections.

In accordance with techniques of the disclosure, computing device 60 may output a graphical keyboard, for display at presence-sensitive display 92 of visual display device 90. For instance, computing device 60 may send data that represents the graphical keyboard to communication unit 70. Communication unit 70 may send the data via external network 74 or direct device communication 78 to visual display device 90. Visual display device 90 may cause presence-sensitive display 92 to output the graphical keyboard for display.

Computing device 60 may receive an indication of a gesture detected at a location of presence-sensitive input 92 that outputs the graphical keyboard. For instance, visual display device 90 may receive an indication of user input detected at presence-sensitive display 92. Visual display device may send data that represents the indication of user input to communication unit 70 via external network 74 or direct device communication 78. Communication unit 70 may send the data to computing device 60.

Computing device 60 may determine, based on at least one spatial feature of the gesture that is processed by the computing device using a neural network, at least one character string, wherein the at least one spatial feature indicates at least one physical property of the gesture. For instance, computing device 60 may apply a column vector of input values corresponding to the indication of the gesture to the neural network. Computing device 60 may determine output values provided by the neural network that represent probabilities of one or more characters and or character strings. In some examples, computing device 60 may determine an output value provided by the neural network that represent a probability of the at least one character string.

Computing device 60 may output, for display at presence-sensitive display device 92, based at least in part on the processing of the at least one spatial feature of the gesture using the neural network, the at least one character string. For instance, computing device 60 may send data that represents the at least one character string to communication unit 70. Communication unit 70 may send the data via external network 74 or direct device communication 78 to visual display device 90. Visual display device 90 may cause presence-sensitive display device 92 to output the at one character string for display.

FIG. 4 is a conceptual diagram illustrating a memory block 100 of a Long-Short Term Memory (LSTM) for decoding user input that is provided at a graphical keyboard, in accordance with one or more aspects of the present disclosure. In some examples, memory block 100 may be implemented as hardware, software, and/or a combination of hardware and software. For instance, in some examples, memory block 100 may be implemented as a software component or module that is executable by one or more processors. Although a single memory block 100 is shown for illustration purposes, a neural network implemented as an LSTM for decoding user input that is provided at a graphical keyboard may include any number of memory blocks. In some examples, memory block 100 may be implemented in network networks 48 of keyboard module 22 as shown in FIG. 2

As shown in FIG. 4, memory block 11 may receive an input matrix 102. As described in FIG. 1, the input values of the spatial features at a particular point in time may be structured in a "frame," which may be a column vector (e.g., column matrix) of input matrix 102. For instance, each column of input matrix 102 may represent a set of input values for spatial features as sampled over time and/or in sequence, the rows of the input matrix may represent the different features, and a cell in the input matrix may include an input value of a particular feature at a particular time or place in the sequence. In some examples, input matrix 102 may be expressed as Equation (1), where d indicate features associated with a gesture and T represents the length of the gesture:

$$x \in \mathbb{R}^{d \times T} \tag{1}$$

As shown in FIG. 4, memory block 100 implements activation functions 104A and 104B ("activation functions 104"), which may each apply a non-linearity function to its respective inputs, such as $x_t$, $y_{t-1}$ and $c_t$ that results in a non-linear transformation of the inputs, where t represents a particular point in time. Examples of activation functions 104 may include but are not limited to logistic functions, rectifier functions, and soft activation functions, to name only a few examples. Memory block 100 also implements gate functions $g_i$ 106A (e.g., input gate), $g_f$ 106B (e.g., forget gate), and $g_o$ 106C (e.g., output gate) (collectively "gate functions 106"). Examples of activation gate functions 106 may include but are not limited to a sigmoid function, hyperbolic tangent function, rectified linear function, linear function, and normalized exponential function, to name only a few examples. Gate functions 104 may control the linearity of values within memory block 100 or otherwise scale such values within memory block 100, where such values include but are not limited to $x_t$, $s_t$, $c_t$, $c_{t-1}$, $o_t$, $i_t$, $y_t$, $y_{t-1}$, $f_t$, to name only a few examples. Memory block 100 also includes a self-loop 108, which may represent a memory cell that retains state information based on previous output information of output matrix $y_{t-1}$, which is further described in this disclosure. In some examples, self-loop 108 of memory block 100 enables training of memory block 100 on multi-letter sequences and/or a matrix of input values received over time. For instance, self-loop 108 may preserve state in $c_t$, which may change in transitions from previous state to new state.

As keyboard module 22 receives or otherwise generates frames of input values, such as frame $x_t$ 110 (which may be a column vector of input matrix 102), the frames are inputted into memory block 100. For an input sample $x \in \mathbb{R}^{d \times T}$, such as including frame $x_t$ 110, memory block 100 computes the following functions, represented by Equations 2-7 to produce an output matrix $y_t$.

$$s_t = h_s(W_s(y_{t-1} + x_t)) \tag{2}$$

$$i_t = g_i(W_i(y_{t-1} + x_t + c_{t-1})) \tag{3}$$

$$f_t = g_f(W_f(y_{t-1} + x_t + c_{t-1})) \tag{4}$$

$$c_t = i_t \odot s_t + c_{t-1} \odot f_t \tag{5}$$

$$o_t = g_o(W_o(x_t + y_{t-1} + c_t)) \tag{6}$$

$$y_t = o_t \odot h_o(c_t) \tag{7}$$

Equations 2-7 illustrate $W_s$ as being the same size for $y_{t-1}$ and $x_t$. However, in some examples, different parameter matrices and/or matrices of different size may be applied separately to $y_{t-1}$ and $x_t$. For instance, $W_{s1}$ may be applied to $y_{t-1}$ and $W_{s2}$ may be applied to $x_t$.

In the above equation, $x \in \mathbb{R}^d$ may be the t-th column of the input matrix x 102. $W_s$, $W_i$, $W_f$, $W_o$ may be referred to as the memory cell 108's or memory block's 100 learnable parameters. In the above equations, $i_t$, $f_t$, $o_t$ are respectively the input, forget and output gates' outputs. In addition, $g_i$, $g_f$ and $g_o$ may be the input, forget and output gates activation functions. In some examples, $h_s$ and $h_o$ are the input and output activations and is the element wise product. After passing the entire sequence through this function, the LSTM produces an output $y \in \mathbb{R}^{|C| \times T}$ where C is a set of permitted characters, such as characters in a character set.

Memory block 100 may generate, as output, one or more probabilities of one or more characters based on one or more input values. The output values of the neural network may be structured in a column vector, such as column vector $y_t$ 114 (e.g., column matrix) of an output matrix 112. For instance, each column of output matrix 112 may represent a set of probabilities for respective characters based on a respective frame $x_t$ 110 that is input to memory block 100. The rows of output matrix 112 may represent different characters of a character set, and a cell in output matrix 112 may include a probability of a particular character for the respective frame that was input into memory block 100. Column vector $y_{t-1}$ 116 may be a previous column vector of output values that is used by memory block 100 when computing column vector $y_t$ 114 for frame $x_t$ 110. In equation 6, memory block 100 determines column vector $y_t$ 114 by computing a column vector dot product of output gate value $o_t$ and the output of activation function 104B that takes the current state $c_t$ of memory cell 108 as input to the activation function.

In some examples, a column vector of an output matrix 112 may include a "blank character," and/or a probability of a blank character. For instance, a row of output matrix 112 may correspond to a blank character. A cell in the row of a column vector for the blank character may include a probability that the same character is repeated over multiple frames. As an example, if user intended to enter the word "look" and memory block 100 generated an output matrix that included a transcription "loook," column 2 (e.g., a column vector) of the output matrix may include a probability in a cell that corresponds to the blank character. The probability in the cell that corresponds to the blank character may be higher than the probabilities in the column vector of one or more other characters, or may indicate a highest probability of the probabilities in the column vector of one or more other characters.

Memory block 100 generates column vector $y_t$ 114 by computing a column vector dot product of the output of activation function 104B and output gate value $o_t$, which scales the output of activation function 104B. In some examples, output gate value $o_t$ may be an integer value or a floating-point value. In some examples, output gate value $o_t$ may be set by a user, may be a predefined value that hardcoded by a computing device, or may be altered by memory block 100 based on training memory block 100 or in response to actual use by a user of a computing device that implements memory block 100. In some examples, memory block 100 applies output gate value $o_t$ to scale outlier values of activation function 104B. As described in equation 5, memory block 100 may determine matrix column vector dot products of $W_o$ and $x_t$, $W_o$ and $y_{t-1}$, and $W_o$ and $c_t$. Memory block 100 may sum each of these matrix column vector dot products and provide the sum as input to gate function 106C, which produces output gate value $o_t$.

As described above, upon receiving each frame, such as frame $x_t$ 110, memory block 100 may compute the functions represented by Equations 2-7 to produce an output matrix $y_t$. In equation 2, memory block 100 computes activation function 104A. In particular, memory block 100 computes a matrix column vector dot product of $W_s$ and $y_{t-1}$, and further computes a matrix column vector dot product of $W_s$ and $x_t$. Memory block 100 sums the two matrix column vector dot products generated in equation 2 and provides the sum as input to activation function 104A. Memory block 100 determines the output of activation 104A as $s_t$, which is multiplied by $i_t$ that is computed in equation 3. The product of $s_t$ and $i_t$ are summed with $c_{t-1}$ of memory cell 108 to generate $c_t$, where $c_t$ is the present state of memory cell 108 for frame $x_t$ 110, and where $c_{t-1}$ is the previous state maintained by memory cell 108 for the previous frame $x_{t-1}$.

In equation 3, memory block 100 determines matrix column vector dot products of $W_f$ and $y_{t-1}$, $W_f$ and $x_t$, and $W_f$ and $c_{t-1}$. Memory block 100 may sum these matrix column vector dot products and provide the sum as input to gate function 106B, which generates forget gate output $f_t$. The forget gate output $f_t$ may be multiplied by the previous state $c_{t-1}$ of memory cell 108, the product of which is summed with the product of $s_t$ and $i_t$ to generate the current state $c_t$ of memory cell 108, as shown in FIG. 4. The current state $c_t$ of memory cell 108 is computed by memory block 100 as described in equation 4 above and in this paragraph.

As shown in FIG. 4, each of gate functions 106A, 106B, and 106C take multiple input values to generate its respective output value. For instance, gate function 106A takes the input frame $x_t$ 110, previous output column vector $y_{t-1}$ 116, and previous state $c_{t-1}$ of memory cell 108 as input values, in order to generate $i_t$. Gate function 106B takes the input frame $x_t$ 110, previous output column vector $y_{t-1}$ 116, and previous state $c_{t-1}$ of memory cell 108 as input values, in order to generate $f_t$. Gate function 106A takes the input frame $x_t$ 110, previous output column vector $y_{t-1}$ 116, and previous state $c_{t-1}$ of memory cell 108 as input values, in order to generate $o_t$.

Gate functions 106 and activation functions may collectively learn a function $f: \mathbb{R}^{d \times T} \to W^1$ where T is the length of the gesture, d is the number of features in the each input frame and W is the set of permitted words, by modifying learnable parameters $W_s, W_i, W_f, W_o$. For instance, memory block 100 may update learnable parameters $W_s, W_i, W_f, W_o$ over time to improve the accuracy with which memory block 100 determines the correct one or more characters or character strings for a gesture. In some examples, the d features associated with an input x may contain data including but not limited to: the keys the finger touches, current time from last gesture and type of gesture (a down press or an up lift of a finger).

In some examples, memory block 100 modifies by the learnable parameters $W_s, W_i, W_f, W_o$ by using back propagating an amount of error to activation functions 104 and gate functions 106. The amount of error may be a difference between an actual output value provided by memory block 100 and an expected output value, given a particular input value. For instance, when training memory block 100, a training set of input values may be applied as frames to memory block 100. The training set may include input values and respective expected output values. Based on the degree of difference between an actual output value provided memory block 100 and an expected output value of the training set, memory block 100 may modify one or more of learnable parameters $W_s, W_i, W_f, W_o$. For instance, the greater the degree of difference (e.g., amount of error) between an actual output value provided memory block 100 and an expected output value of the training set, the larger the modification to one or more of learnable parameters $W_s, W_i, W_f, W_o$.

In some examples, memory block 100 may increase the values of one or more of learnable parameters $W_s, W_i, W_f, W_o$ based on the degree of difference. In some examples, memory block 100 may decrease the values of one or more of learnable parameters $W_s, W_i, W_f, W_o$ based on the degree of difference. In some examples, the magnitude of the modification to one or more of learnable parameters $W_s, W_i, W_f, W_o$ may be linearly proportional to the degree of difference between an actual output value provided memory block 100 and an expected output value of the training set. In some examples, the magnitude of the modification to one or more of learnable parameters $W_s, W_i, W_f, W_o$ may be non-linearly proportional to the degree of difference between an actual output value provided memory block 100 and an expected output value of the training set.

A neural network for decoding user input provided at a graphical keyboard may be trained using one or more functions. In the example of FIG. 4, memory block 100 may implement a Connectionist Temporal Classification (CTC) Loss function to train recurrent networks on unaligned targets. For instance, the CTC loss function may determine the degree of difference between an actual output value provided by memory block 100 and an expected output value, given a particular input value from a training set. Memory block 100 may perform the training by maximizing the sum of probabilities of all frame-wise sequences that correspond to the target sequence. For instance, memory block 100 may determine the loss using the following computations:

$$\mathcal{L}(x, z) = -\log(p(z|x)) \quad (8)$$

$$p(z|x) = \sum_{\pi \in A(z)} p(\pi|x) \quad (9)$$

$$p(\pi|x) = \prod_{t=1}^{T} y_{\pi_t}^t \quad (10)$$

where x is the input sequence, z is the target transcription (e.g., one or more characters or character strings), A(z) is the set of all CTC transcriptions of a target transcript (e.g., for the word data, π is a particular transcription, and the transcriptions may include "daata," "datta," "dddata," to illustrate only a few examples). In equations 8-10, y is the output of the LSTM or more generally, a recurrent network. Equations 10 and 9 provide the basis for computing equation 8. In this way, the output of equation 8, i.e., $\mathcal{L}(x, z)$, may be used to modify the one or more of learnable parameters $W_s$, $W_i$, $W_f$, $W_o$, as described above, by, for example, increasing, decreasing, or otherwise modifying one or more of learnable parameters $W_s$, $W_i$, $W_f$, $W_o$.

In some examples, memory block 100 may compute the loss described in equation 8 by implementing a forward-backward algorithm according to equation 11:

$$p(z|x) = \sum_{s=1}^{|z|} \frac{\alpha_T(s)\beta_T(s)}{y_{z_s}^T} \quad (11)$$

where α and β are respectively the forward and backward variables as described in Alex Graves, Santiago Fernández, Faustino Gomez, and Jürgen Schmidhuber, "Connectionist temporal classification: labelling unsegmented sequence data with recurrent neural networks," in Proceedings of the 23rd international conference on Machine learning. ACM, 2006, pp. 369-376, and can be computed via dynamic programming techniques. In some examples, ẑ is the same as sequence z with blanks inserted in the beginning, end and between symbols. In some examples, $z_s$ is the sequence containing the first s frames of z.

Equation 11 may provide a probability of a character or word given a sequence of frames. Accordingly, memory block 100 may be trained, based on the loss computed from equations 8 and/or 11), to maximize the probability that a transcription (e.g., a sequence of characters outputted by memory block 100 based on a sequence of input frames) or set of transcriptions indicates a character or word that is included in a defined corpus of characters and words. The defined corpus of characters or words may be one or more dictionaries for written and/or spoken languages. Examples of such dictionaries may include an English dictionary, Chinese dictionary, and Spanish dictionary, to name only a few examples.

During training, memory block 100 may be trained to maximize one or more probabilities that transcriptions "daata," "datta," "dddata," each correspond to the word "data" by modifying one or more of learnable parameters $W_s$, $W_i$, $W_f$, $W_o$ based on the loss computed from equations 8 and/or 11. Accordingly, memory block 100 may implement equation 11 to determine, based on output matrix y 112, a probability of the word "data" given an input matrix that results in the transcription "daata." In some examples, memory block 100 may implement equation 11 to determine, a probability of the word "data" given an input matrix that result in possible transcriptions {"daata," "datta," "dddata,"}. In some examples, memory block 100 determines the probability of the word "data" given an input matrix by the summing the respective probabilities of each transcription in the set {"daata," "datta," "dddata,"} given the input matrix. In some examples, using a CTC loss function during training may allow computing device 10 to train the network to output characters directly, without the need for Hidden Markov Model (HMM) states.

As described above, memory block 100 may be trained to maximize the probabilities of characters and words in a defined corpus, given input matrices that result in various transcriptions. As such, memory block 100 may be trained using a training set as described above to modify the values of learnable parameters $W_s$, $W_i$, $W_f$, $W_o$ for one or more processed frames of input values from the training set to provide for more accurate character and word recognition based on gesture input at graphical keyboard. In some examples, once memory block 100 has been trained to more accurately determine characters and words based on gesture input at a graphical keyboard, a user may use computing device 10 to input text using the trained neural network that includes at least memory block 100. Techniques for decoding using input using the trained neural network that that includes memory block 100 are further described in FIG. 5.

Figure 6:
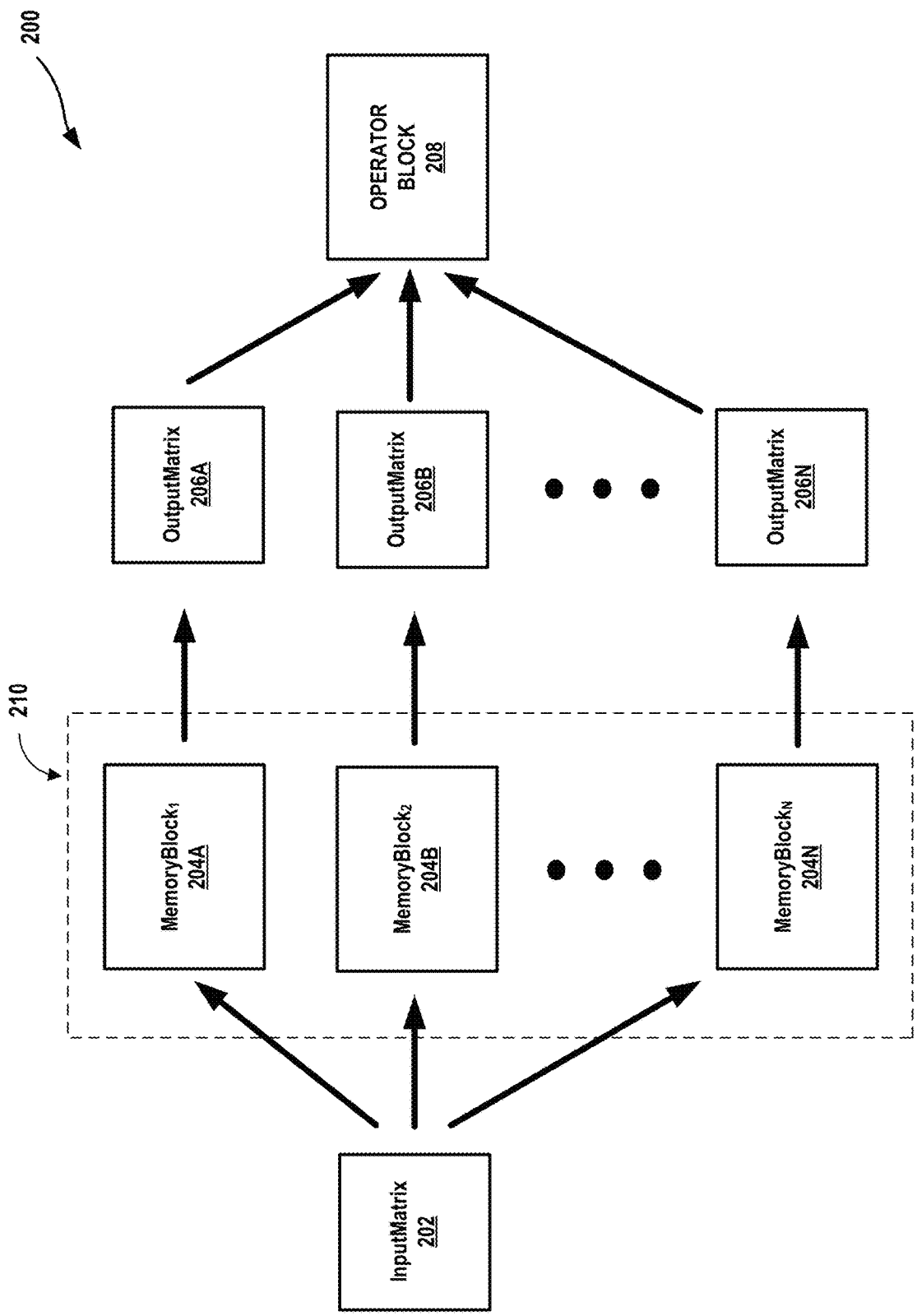
FIG. 6 is a conceptual diagram illustrating multiple memory blocks of a Short Term Memory (LSTM) for decoding user input that is provided at a graphical keyboard, in accordance with one or more aspects of the present disclosure.

Although the example of FIG. 4 illustrates a single memory block 100, computing device 10 may implement multiple memory blocks that operate as described with respect to memory block 100. Collectively, multiple memory blocks may operate as one or more neural networks that decode user input provided at a graphical keyboard. In some examples, the multiple memory blocks may be organized and/or interconnected as one or more layers of memory blocks. FIG. 6 further describes examples of multiple memory blocks that may be organized and/or interconnected as one or more layers of memory blocks, in accordance with techniques of this disclosure.

Artificial neural network architectures as described in this disclosure may have varying depth, width and directionality. In some examples, keyboard module 22 may determine a set C that includes a set of small case English characters in addition to the apostrophe, comma and dot characters. In some examples, keyboard module 22 may set C=W. Keyboard module 22 may initialize all weights or learnable parameters to be Gaussian distributed with a mean of 0 and a standard deviation of 0.01. An LSTM that uses memory block 100 may use a hyperbolic tangent activation unit for cell inputs and outputs and logistic units for all the gates. Keyboard module 22 may implement gradient clipping to avoid gradient explosion. In some examples, keyboard module 22 trains neural network with a learning rate set to 0.01.

FIG. 5 is a conceptual diagram illustrating a Finite State Transducer 150 for modeling probabilities of character sequences output by a neural network, in accordance with one or more aspects of the present disclosure. In some examples, FST 150 may be implemented as hardware, software, and/or a combination of hardware and software. For instance, in some examples, FST 150 may be implemented as a software component or module that is executable by one or more processors. Although a FST 150 is shown for illustration purposes, a neural network implemented for decoding user input that is provided at a graphical keyboard may use any number of FSTs. In some examples, FST 150 may be implemented in FSTs 54 of keyboard module 22 as shown in FIG. 2.

After training, an LSTM network may produce one or more matrices or the form $y \in \mathbb{R}^{|C| \times T}$. In order to constrain the decoded result to a set of limited words $\mathcal{W}$, keyboard module 22 may use a a trie-shaped lexicon FST 150. In some examples, keyboard module 22 generates FST 150 with another FST that maps CTC blanks, or blank characters as described in FIG. 4, into FST epsilons. An FST epsilon may represent a cost of transitioning from one state another, and the blank character may have a particular cost represented by the FST epsilon.

In some examples, keyboard module 22 generates FST 150 based on a defined corpus of characters and words, such as one or more dictionaries of one or more spoken and/or written languages. In the example of FIG. 5, only two words, "go" and "forth," from a corpus are modeled by keyboard module 22 in FST 150 for example purposes. However, any number of words and/or character strings from the corpus may be modeled in FST 150. Keyboard module 22 may implement FST 150 using a directed graph, which may include cycles in some examples. Each edge from one node to a next node represents a particular character, and each edge may have a corresponding cost. The cost for an edge may be a negative log probability of the particular character associated with the edge, where the probability for the character is determined from a column vector of an output matrix of a neural network, as previously described for example in FIG. 4.

As previously described in FIGS. 1 and 4, a neural network may output probabilities of one or more respective characters given input values. In the example of an LSTM, a memory block may output an output matrix given an input matrix of input values. As previously described in herein, each column vector of the output matrix may include one or more probabilities of one or more respective characters. Keyboard module 22 may process each column vector of the output matrix in sequence and model the probabilities of respective characters on respective edges of FST 150. For instance, keyboard module 22 may determine a column vector $y_t$, of and output matrix y. Column vector $y_t$ includes probabilities for characters given an input frame $x_t$. In the example of FIG. 5, keyboard module 22 determines that starting node 152 includes edges 154 and 156 to respective next nodes 158 and 160. In particular, keyboard module 22 determines that edge 154 corresponds to a character 'g'. Accordingly, keyboard module 22 determines the probability that corresponds to character 'g' from column vector $y_t$. In some examples, keyboard module 12 determines a character cost equal to the negative log of the probability of 'g' and associates this character cost with edge 154. In a similar way, keyboard module 22 determines that edge 156 corresponds to a character 'f'. Accordingly, keyboard module 22 determines the probability that corresponds to character 'f' from column vector $y_t$. In some examples, keyboard module 12 determines a character cost equal to the negative log of the probability of 'f' and associates this character cost with edge 156.

Keyboard module 22 then determines a column vector $y_{t+1}$, of and output matrix y. Column vector $y_{t+1}$ includes probabilities for characters given an input frame $x_{t+1}$. In the example of FIG. 5, keyboard module 22 determines that next nodes 158 and 160 includes edges 166 and 168 to respective next nodes 162 and 164. In particular, keyboard module 22 determines that edge 166 corresponds to a character 'o'. Accordingly, keyboard module 22 determines the probability that corresponds to character 'O' from column vector $y_{t+1}$. In some examples, keyboard module 12 determines a character cost equal to the negative log of the probability of 'o' and associates this character cost with edge 166. In a similar way, keyboard module 22 determines that edge 168 corresponds to a character 'o'. Accordingly, keyboard module 22 determines the probability that corresponds to character 'o' from column vector $y_{t+1}$. In some examples, keyboard module 12 determines a character cost equal to the negative log of the probability of 'o' and associates this character cost with edge 168. Keyboard module 22 may continue to process each column vector $y_{t+i}$ of the output matrix, associating each probability of a character in each column vector with a subsequent edge of FST 150. In this way, each path of FST 150 may represent a sequence of characters, where each sequence of characters includes an overall cost equal to the sum of the costs of each edge in the path. As further described in this disclosure, keyboard module 22 may determine one or more paths with the lowest costs, which represent the most likely character strings that correspond to one or more gestures.

In some examples, keyboard module 22, may use a language model, such as language model 28 of FIG. 2, to apply additional costs in FST 150. For instance, keyboard module 22 may associate a language model cost 170 with an edge that follows of a sequence of edges representing a character or word in a defined corpus of characters and words. Language model cost 170 may indicate a likelihood of a word, represented by a sequence of characters in a path, in a given input context. In some examples, an input context may include an identity of a user of the computing device, a geolocation of the computing device, an environment and/or climate of the computing device, audio and/or visual information determined by the computing device, sensor information detected by the computing device, type of input field for which text is entered by user, application for which text is entered by user, recipient of text entered by user, to name only a few examples.

Keyboard module 22 may use a detected input context and language model 28 to determine language model cost 170. In some examples, language model cost 170 may be the negative log of a probability provided by language model 28 for the word "go" given a particular input context. Keyboard module 22 may associate language model cost 170 with an edge 172 that follows a set of edges 154, 156 that represent a word "go" in a defined corpus of characters and words, such as an English word dictionary that is stored at computing device 10. In this way, the combined cost of a path in FST 150, such as a path that includes edges 154, 166, and 172, may account for an input context to improve the determination of the character or word intended by the input of the user. Accordingly, FST 150 may determine the total costs of one or more paths from starting node 152 to terminating node 174. Terminating node 174 may represent a boundary between a character or word of a defined corpus of words and characters.

In some examples, keyboard module 22 may determine a set of one or more paths through FST 150 that include the lowest costs. The size of the set of paths may be user defined or a value that is hard-coded in computer 10, or may be automatically determined based on learning one or more parameters. In any case, the set of paths with the lowest costs may represent the characters and/or words that are mostly likely intended by the user input provided by user at the graphical keyboard. For instance, the path with the lowest cost may represent the most likely word that corresponds to the gesture (e.g., the most likely word intended by the user). A path with the next lowest cost may represent the second most likely word that corresponds to the gesture, and so forth. In some examples, keyboard module 22 may determine overall costs of one or more paths using a beam search that explores FST 150 by maintaining a limited set of paths (or sequences of characters) that are associated with the lowest combined costs. In some examples, the edge transitions costs in FST 150 for respective characters are the context-independent log probabilities from the output matrix y. Keyboard module 22 may decode a resulting output matrix using FST 150 with a beam search, where arc transitions costs are the context-independent log probabilities from the output matrix. In some examples, keyboard module 22 may further extend techniques of this disclosure to use a language model by performing a composition of FST 150 with another FST that includes language model data.

In some examples, computing device 10 may output one or more characters or character strings for display that have lowest combined costs. For instance, as described with respect to FIG. 1, keyboard module 22 may output one or more character strings in character string suggestion regions 38A-38C. As shown in FIG. 1, the three character strings with the lowest combined costs (or highest combined probabilities) may be output for display in suggested character string regions 38A-38C. In the example of FIG. 1, the combined cost associated with the character string "satin" may be the lowest combined cost, followed by "sarin," and then "saying." In some examples, one or more character strings may be output for display in edit region 16A and/or at graphical keyboard 16B.

In some examples, UI module 20 may update suggested character string regions 38A-38C by including at least one highest ranking candidate character string as suggested character strings, as gesture 30 is being performed by a user. From user interface 14, the user can select one of suggested character strings 38 by tapping or providing an input at a location of presence-sensitive display 12 where presence-sensitive display 12 outputs suggested character string regions 38A-38C. For example, the user may select a suggested character string region by tapping or gesturing over the location of presence-sensitive display 12 where presence-sensitive display 12 presents a suggested character string, e.g., "satin." Selecting suggested character string region 38A may cause UI module 20 to update user interface 14 and include character string "satin" in edit region 16A.

As described above in the example of FIG. 5, keyboard module 22 may generate FST 150 based on a defined corpus of characters and words, such as one or more dictionaries of one or more spoken and/or written languages. Although only two words, "go" and "forth," from a corpus are modeled by keyboard module 22 in FST 150 for example purposes, any number of words and/or character strings from the corpus may be modeled in FST 150. In some examples, one or more character strings that represent possible transcriptions may be modeled along paths in the same or a similar manner that "go" and "forth" are modeled in FIG. 5. For instance, a variety of transcriptions such as "forrrth," "foorth," "forttth," to illustrate only a few examples, may each map to the word "forth," in a dictionary. Keyboard module 22 may map characters of each respective transcription along a respective path of FST 150. For instance, each of the transcriptions such as "forrrth," "foorth," "forttth," may be modeled on a separate path in FST 150. In some examples, mapping a value (e.g., cost or character) to an edge or node may include associating the value with the edge.

Each character of a transcription, such as "forrrth," may correspond to a character in a particular column vector of an output matrix. For instance, keyboard module 22 may generate an output matrix that includes a set of column vectors, wherein the set of column vectors is in an ordered sequence over time. As keyboard module 22 processes each column vector, keyboard module 22 may assign the respective probability for a character to each edge in FST 150 that corresponds to the respective character as described above with respect to the examples of "go" and "forth." For instance, on a path for a transcription "forrrth," a first edge between the starting node and a second node may correspond to the character "f" and keyboard module 22 may determine the probability of "f" as included in a first column vector of an output matrix. Keyboard module 22 may assign the probability of "f" to the first edge. A second edge between the second node and a third node in FST 150 may correspond to the character "o" and keyboard module 22 may determine the probability of "o" as included in a second column vector of an output matrix. Keyboard module may assign the probability of "o" to the second edge. Keyboard module 22 may repeat this process for each column vector of the output matrix to model the probabilities of characters along paths corresponding to transcriptions, such as "forrrth," in FST 150.

A path in FST 150 for a transcription such as "forrrth," may also include a transcription cost, which is associated with an edge at the end of a path prior to the terminal node. Keyboard module 22 may store data that maps a transcription (which may not be an actual word of a written or spoken vocabulary) to a character string that is an actual word of a written or spoken vocabulary. For instance, keyboard module 22 may store data that maps the transcription "forrrth," to the word "forth" from the English language. Keyboard module 22 may further store a transcription cost associated with the mapping of the transcription "forrrth," to the word "forth." Keyboard module 22 may associate this transcription cost with an edge at the end of a path prior to the terminal node. In some examples, the transcription cost may be based on a language model cost. In some examples, a path for a transcription in FST 150 may include a first edge for a transcription cost and a second edge for a language model cost, each at the end of the path and prior to the terminal node, where the language model cost indicates the likelihood of the word that is mapped to the transcription given an input context.

As described above keyboard module 22 may use FST 150 to determine the total costs of one or more paths from starting node 152 to terminating node 174. For instance, keyboard module 22 may determine a set of one or more paths through FST 150 that include the lowest costs. If keyboard module 22 selects or otherwise determines total a cost associated with a path for a transcription, such as "forrrth," is a lowest cost or a cost that satisfies a threshold (e.g., less than the threshold), keyboard module 22 may determine a word "forth" that is mapped to the transcription "forrrth". Keyboard module 22 may then output the word "forth" for display or otherwise use the word "forth" for other operations such as auto-prediction, auto-correction, and/or auto-suggestion, to name only a few examples.

In some examples, the techniques of FIGS. 4-5 may be extended to determine language model costs, such as language model cost 170. In particular, techniques of this disclosure may define or otherwise determine language model costs of language model 28 by using an LSTM or neural network that is trained on a per-character, per-word, and/or per-multi-word phrase basis. For instance, keyboard module 22 may input, as features to a neural network, one or more character strings from a training set and determine an actual output value, which may be a character string that is compared with an expected output value that is also a character string. As an example, keyboard module 22 may input, as features to a neural network, a character string "the dog" from a training set and determine an actual output value, which may be a character string "was" that is compared with an expected output value that is also a character string "went." Keyboard module 22 may determine the degree of difference between the character string "was" and the character string "went" (e.g., determining the degree to which the characters differ within a character position or between character positions, to name only a few such examples). Keyboard module 22 may modify the one or more of learnable parameters by, for example, increasing, decreasing, or otherwise modifying one or more of learnable parameters, as described in FIGS. 4-5. Language model 28 may therefore be implemented as a neural network that is trained to provide probabilities for words given an input context. Accordingly, a neural network may be output a one or more words and respective probabilities for the one or more words, given an input context that includes but is not limited to one or more inputted strings. As described in FIG. 5, probabilities determined from language model 28 may be used to generate language model costs that are associated with edges of FST 150.

FIG. 6 is a conceptual diagram illustrating multiple memory blocks of a Short Term Memory (LSTM) 200 for decoding user input that is provided at a graphical keyboard, in accordance with one or more aspects of the present disclosure. In some examples, LSTM 200 may be implemented as hardware, software, and/or a combination of hardware and software. For instance, in some examples, LSTM 200 may be implemented as a software component or module that is executable by one or more processors. In some examples, LSTM 200 may be implemented neural networks 48 of keyboard module 22 as shown in FIG. 2.

LSTM 200, as shown in FIG. 6 includes multiple memory blocks 204A-204N ("memory blocks "204A-204N") that may be organized and/or interconnected as one or more layers of memory blocks. For purposes of illustration, a single layer 210 of memory blocks 204 are shown; however, any number of layers of memory blocks may be implemented in FIG. 6. A memory block as shown in FIG. 6 may implement the functionality of memory block 100 as described in FIG. 4. For instance, a second layer (not shown) of memory blocks may be implemented between layer 210 and operator block 208. The second layer may have a different number of memory blocks than layer 210 or may have the same number of memory blocks as layer 210. In some examples, each memory block of the second layer may receive as input, one or more outputs of one or more memory blocks of the first layer 210. In some examples, one or more memory blocks of layer 210 may operate different than one or more other memory blocks within layer 210. In some examples, one or more memory blocks of layer 210 may operate differently than one or more memory blocks in a second layer of LSTM 200.

In the example of FIG. 6, each of memory blocks 204 may receive input matrix 202, as described in FIGS. 1-5. In some examples, one or more of memory blocks 204 is initialized differently than other memory blocks of memory block 204. For instance, one or more learnable parameters $W_s$, $W_i$, $W_f$, $W_o$ may be initialized differently for one or more of memory blocks 204. In some examples, a memory block may be initialized randomly. For instance, one or more of learnable parameters $W_s$, $W_i$, $W_f$, $W_o$ are initialized randomly. In some examples, each of memory blocks 204 may correspond to a different character of a character set. In such examples, each respective block may be initialized based on to initialization data for a particular character, e.g., the initialization data is specific to a particular character. In any case, upon initializing each of memory blocks 204, keyboard module 22 may train each of memory blocks 204 as described in FIGS. 4-5.

In response to a user providing user input, keyboard module 22 may provide input matrix 202 that corresponds to the user input to each of memory blocks 204. Each of memory blocks 204 may process input matrix as described in FIGS. 4-5 to generate respective output matrices 206A-206N (output matrices 206A-206N). Each of output matrices may be provided as input to operator block 208. In some examples, operator block 208 may implement one or more functions. The one or more functions may provide aggregation, selection, and/or transformation of data inputted into operator block 208, to name only a few such example functions. Examples of such function may include the softmax function or sigmoid function, to name only a few such examples. In the example of FIG. 6, operator block 208 may implement the softmax function to determine which letter in each column vector at a particular index of output matrices 206 has the highest probability. For instance, operator block 208 may determine for each column vector at index i of output matrices 206 has the highest probability. In some examples, keyboard module 22 may then model this probability of a character in an FST, such as FST 150. For instance, keyboard module 22 may associate the probability of the character output from operatory block 208 with one or more edges of FST 150, as described in FIG. 4. In some examples, operator block 208 may output more than one probability a set of respective column vectors at index i of respective output matrices 206.

Figure 7:
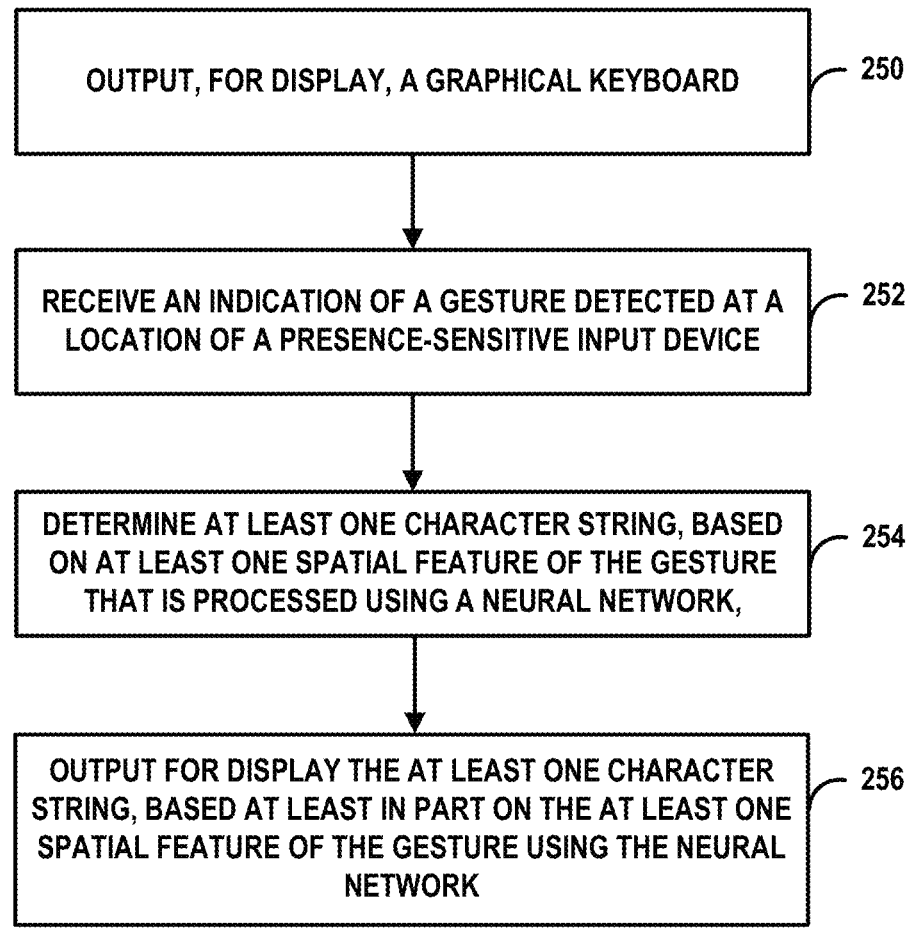
FIG. 7 is a flowchart illustrating example operations of a computing device configured to use a neural network to decode user input that is provided at a graphical keyboard, in accordance with one or more aspects of the present disclosure.

FIG. 7 is a flowchart illustrating example operations of a computing device configured to use a neural network to decode user input that is provided at a graphical keyboard, in accordance with one or more aspects of the present disclosure. For purposes of illustration, the example operations are described below within the context of computing device 10, as shown in FIGS. 1 and 2. Computing device 10 may initially Computing device 10 may initially output, for display at an output device operatively coupled to the computing device, a graphical keyboard (250). For instance, as shown in FIG. 1, computing device 10 may output graphical keyboard 16B in user interface 14. Computing device 10 may receive an indication of a gesture detected at a location of a presence-sensitive input device (252). In some examples, the location of the presence-sensitive input device corresponds to a location of the output device that outputs graphical keyboard 16B.

Computing device 10 may determine, based on at least one spatial feature of the gesture that is processed by the computing device using a neural network, at least one character string, wherein the at least one spatial feature indicates at least one physical property of the gesture (254). For instance, computing device 10 may apply a column vector of input values corresponding to the gesture as input to the neural network. Computing device 10 may determine output values provided by the neural network that represent probabilities of one or more characters and or character strings. In some examples, computing device 10 may determine an output value provided by the neural network that represent a probability of the at least one character string.

Computing device 10 may output, for display at the output device, based at least in part on the processing of the at least one spatial feature of the gesture using the neural network, the at least one character string (256). For instance, computing device 10 may output the at least one character string as a character string suggestion. In some examples, the at least one character string may have a probability that satisfies a threshold, such that when the threshold is satisfied, the character string is output for display by computing device 10.

In some examples, to determine the sequence of touch events represents a selection of one or more keys, computing device 10 may include a spatial model. However, in some examples, computing device 10 may not include a spatial model. In some examples, computing device 10 may not include a language model. In some examples, computing device 10 may not include both a language model and a spatial model.

In general, a spatial model may generate one or more probabilities that a particular key of a graphical keyboard has been selected based on location data associated with a user input. In some examples, a spatial model includes a bivariate Gaussian model for each key. The bivariate Gaussian model for a key may include a distribution of coordinates (e.g., (x,y) coordinate pairs) that correspond to locations of a presence-sensitive input device that present the given key. More specifically, in some examples, a bivariate Gaussian model for a key may include a distribution of coordinates that correspond to locations of a presence-sensitive input device that are most frequently selected by a user when the user intends to select the given key. The shorter the distance between location data of a user input and a higher density area of a spatial model, the higher the probability that the key associated with a spatial model has been selected. A greater distance between location data of a user input and a higher density area of a spatial model, the lower the probability that the key associated with spatial model has been selected.

In some examples, computing device 10 may use a spatial model to compare the location components (e.g., coordinates) of one or more touch events in the sequence of touch events to respective locations of one or more keys of a graphical keyboard and generate a probability based on these comparisons that a selection of a key occurred. In some examples, computing device 10 may generate a spatial model score using a spatial model. The spatial model score may indicate a probability of a selected key based at least in part on locations of a presence-sensitive input device traversed by a gesture. In some examples, a spatial model score may indicate a combined probability of a group of selected keys based at least in part on locations of a presence-sensitive input device traversed by a gesture.

For example, computing device may use a spatial model to compare the location component of one or more touch event in the sequence of touch events to a key location of a particular key of the graphical keyboard. The location component of each touch event in the sequence may include one location of a presence-sensitive input device. A key location (e.g., a centroid of a key) of a key in the graphical keyboard may include a different location of the presence-sensitive input device. Computing device 10 may use a spatial model to determine a Euclidian distance between the two locations and generate a probability based on the Euclidian distance that the key was selected. Computing device 10 may indicate a higher probability for a key that shares a smaller Euclidian distance with one or more touch events than a key that shares a greater Euclidian distance with one or more touch events. Based on the spatial model probability associated with each key, computing device may assemble the individual key selections with the highest spatial model probabilities into a time-ordered sequence of keys that computing device may then determine represents a character string. The combined probabilities of each key may represent a spatial model score for the character string. In some examples, computing device 10 may use spatial model probabilities in conjunction with a neural network, such as mapped to edges of a graph and/or incorporated into character costs modeled on the graph.

EXAMPLE 1

A computing device comprising: at least one processor; and at least one module, operable by the at least one processor to: output, for display at an output device operatively coupled to the computing device, a graphical keyboard; receive an indication of a gesture detected at a location of a presence-sensitive input device, wherein the location of the presence-sensitive input device corresponds to a location of the output device that outputs the graphical keyboard; determine, based on at least one spatial feature of the gesture that is processed by the computing device using a neural network, at least one character string, wherein the at least one spatial feature indicates at least one physical property of the gesture; and output, for display at the output device, based at least in part on the processing of the at least one spatial feature of the gesture using the neural network, the at least one character string.

EXAMPLE 2

The computing device of Example 1, wherein the at least one module is operable by the at least one processor to: input, into the neural network, a plurality of input values for a plurality of features, wherein the plurality of features includes the at least one spatial feature; apply one or more functions of the neural network to the plurality of input values; and determine, based at least in part on the neural network, one or more output values, wherein the least one character string is determined by the computing device based at least in part on at least one of the one or more output values.

EXAMPLE 3

The computing device of any of Examples 1-2, wherein the one or more output values are one or more first output values, wherein the plurality of input values are a plurality of first input values, wherein the one or more output values are one or more first output values, wherein the at least one module is operable by the at least one processor to: store, in the neural network, state information that is based at least in part on the one or more first output values; input, into the neural network, a plurality of second input values for the plurality of features, wherein the plurality of second input values are determined after the plurality of first input values; apply the one or more functions of the neural network to the plurality of second input values; determine, based at least in part on the state information, one or more second output values; and determine, based at least in part on at least one of the one or more second output values, a second character string.

EXAMPLE 4

The computing device of any of Examples 1-3, wherein the plurality of input values are included in cells of a input matrix, wherein each respective column vector of the input matrix comprises a respective set of input values of the plurality of input values, wherein the respective set of input values corresponds to at least one of a particular gesture or portion of a particular gesture, and wherein the plurality of output values are included in cells of an output matrix, wherein each respective column vector of the output matrix comprises a respective set of output values of the plurality of output values, wherein the respective set of output values indicates one or more probabilities of at least one or more characters or one or more character strings.

EXAMPLE 5

The computing device of any of Examples 1-4, wherein the one or more output values indicate one or more probabilities of at least one or more characters or one or more character strings, wherein the at least one module is operable by the at least one processor to: store a graph comprising a plurality of nodes and a plurality of edges, wherein each edge is coupled to one or more of the plurality of nodes; map, to at least one respective edge of the plurality of edges, a character and a character cost that is based at least in part on a probability of the character, wherein the probability is included in the one or more probabilities, wherein a path, in the graph, comprising a set of edges of the plurality of edges that interconnect a set of nodes of the plurality of nodes, represents a string of characters.

EXAMPLE 6

The computing device of any of Examples 1-5, wherein the at least one module is operable by the at least one processor to: determine, based at least in part on a language model, a probability of the string of characters represented by the path; and map, to at least one respective edge of the set of edges of the plurality of edges and based at least in part on the probability of the string of characters, a language model cost.

EXAMPLE 7

The computing device of any of Examples 1-6, wherein the neural network comprises a Long Short Term Memory that includes at least one memory block.

EXAMPLE 8

The computing device of any of Examples 1-7, wherein the neural network comprises a Long Short Term Memory that includes a plurality of layers of memory blocks.

EXAMPLE 9

The computing device of any of Examples 1-8, wherein the at least one module is operable by the at least one processor to: perform at least one of auto-prediction, auto-correction, or auto-completion to generate the at least one character string.

EXAMPLE 10

The computing device of any of Examples 1-9, wherein the at least one module is operable by the at least one processor to: train, based at least in part on a training set, the neural network prior to receiving the indication of the gesture detected at the location of the presence-sensitive input device.

EXAMPLE 11

The computing device of any of Examples 1-10, wherein the computing device does not include a language model and a spatial model.

EXAMPLE 12

The computing device of any of Examples 1-11, wherein the gesture is at least one of a tap gesture, continuous gesture, or combination of tap gesture and continuous gesture.

EXAMPLE 13

A computer-readable storage medium encoded with instructions that, when executed, cause at least one processor to: output, for display at an output device operatively coupled to the computing device, a graphical keyboard; receive an indication of a gesture detected at a location of a presence-sensitive input device, wherein the location of the presence-sensitive input device corresponds to a location of the output device that outputs the graphical keyboard; determine, based on at least feature that is processed by the computing device using a neural network, at least one character string; and output, for display at the output device, based at least in part on the processing of the at least feature that is processed by the computing device using the neural network, the at least one character string.

EXAMPLE 14

A method comprising: outputting, by a computing device and for display at an output device operatively coupled to the computing device, a graphical keyboard; receiving, by the computing device, an indication of a gesture detected at a location of a presence-sensitive input device, wherein the location of the presence-sensitive input device corresponds to a location of the output device that outputs the graphical keyboard; determining, based on the gesture that is processed by the computing device using the neural network, at least one character string; and outputting, by the computing device and for display at the output device, based at least in part on the processing of the gesture that is processed by the computing device using a neural network, the at least one character string.

EXAMPLE 15

The method of Example 14, further comprising: inputting, into the neural network, a plurality of input values for a plurality of features, wherein the plurality of features includes the at least one spatial feature; applying one or more functions of the neural network to the plurality of input values; and determining, based at least in part on the neural network, one or more output values, wherein the least one character string is determined by the computing device based at least in part on at least one of the one or more output values.

EXAMPLE 16

The method of any of Examples 14-15, wherein the one or more output values are one or more first output values, wherein the plurality of input values are a plurality of first input values, wherein the one or more output values are one or more first output values, wherein the method comprises: storing, in the neural network, state information that is based at least in part on the one or more first output values; inputting, into the neural network, a plurality of second input values for the plurality of features, wherein the plurality of second input values are determined after the plurality of first input values; applying the one or more functions of the neural network to the plurality of second input values; determining, based at least in part on the state information, one or more second output values; and determining, based at least in part on at least one of the one or more second output values, a second character string.

EXAMPLE 17

The method of any of Examples 14-16, wherein the plurality of input values are included in cells of a input matrix, wherein each respective column vector of the input matrix comprises a respective set of input values of the plurality of input values, wherein the respective set of input values corresponds to at least one of a particular gesture or portion of a particular gesture, and wherein the plurality of output values are included in cells of an output matrix, wherein each respective column vector of the output matrix comprises a respective set of output values of the plurality of output values, wherein the respective set of output values indicates one or more probabilities of at least one or more characters or one or more character strings.

EXAMPLE 18

The method of any of Examples 14-17, wherein the one or more output values indicate one or more probabilities of at least one or more characters or one or more character strings, wherein the method comprises: storing a graph comprising a plurality of nodes and a plurality of edges, wherein each edge is coupled to one or more of the plurality of nodes; mapping, to at least one respective edge of the plurality of edges, a character and a character cost that is based at least in part on a probability of the character, wherein the probability is included in the one or more probabilities, wherein a path, in the graph, comprising a set of edges of the plurality of edges that interconnect a set of nodes of the plurality of nodes, represents a string of characters.

EXAMPLE 19

The method of any of Examples 14-18, further comprising: determining, based at least in part on a language model, a probability of the string of characters represented by the path; and mapping, to at least one respective edge of the set of edges of the plurality of edges and based at least in part on the probability of the string of characters, a language model cost.

EXAMPLE 20

The method of any of Examples 14-19, wherein the neural network comprises a Long Short Term Memory that includes at least one memory block.

EXAMPLE 21

The method of any of Examples 14-20, wherein the neural network comprises a Long Short Term Memory that includes a plurality of layers of memory blocks.

EXAMPLE 22

The method of any of Examples 14-21, wherein the neural network comprises a Long Short Term Memory that includes a plurality of layers of memory blocks.

EXAMPLE 23

The method of any of Examples 14-22, further comprising: training, based at least in part on a training set, the neural network prior to receiving the indication of the gesture detected at the location of the presence-sensitive input device.

EXAMPLE 24

The method of any of Examples 14-23, wherein the computing device does not include a language model and a spatial model.

EXAMPLE 25

The method of any of Examples 14-24, wherein the gesture is at least one of a tap gesture, continuous gesture, or combination of tap gesture and continuous gesture.

EXAMPLE 26

An apparatus comprising: means for outputting, by a computing device and for display at an output device operatively coupled to the computing device, a graphical keyboard; means for receiving, by the computing device, an indication of a gesture detected at a location of a presence-sensitive input device, wherein the location of the presence-sensitive input device corresponds to a location of the output device that outputs the graphical keyboard; means for determining, based on the gesture that is processed by the computing device using the neural network, at least one character string; and means for outputting, by the computing device and for display at the output device, based at least in part on the processing of the gesture that is processed by the computing device using a neural network, the at least one character string.

EXAMPLE 27

The apparatus of Example 26 comprising means for performing any of the methods of Examples 14-25.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A method comprising:
   outputting, by a computing device, for display, a graphical keyboard that includes a plurality of keys;
   receiving, by the computing device, at least one gesture that selects one or more keys from the plurality of keys;
   determining, by the computing device, based on the at least one gesture and a deep neural network, at least one character string; and
   outputting, by the computing device, for display, the at least one character string.

2. The method of claim 1, wherein the deep neural network is trained based on input sequences corresponding to different selections of the plurality of keys for entering word phrases and sentences.

3. The method of claim 2, wherein the deep neural network is further trained based on a frequency that at least one of: a) the at least one character string or b) the word phrases and sentences, is entered with the graphical keyboard for different contexts associated with the computing device.

4. The method of claim 2, wherein the deep neural network is further trained based on a frequency that the at least one character string occurs in a vocabulary associated with an identity of a user of the computing device.

5. The method of claim 2, wherein the deep neural network is further trained based on a frequency that the at least one character string occurs in a vocabulary associated with an identity of an intended recipient of text including the at least one character string.

6. The method of claim 2, wherein the deep neural network is further trained based on a frequency that the at least one character string occurs in a language context including the word phrases and sentences.

7. The method of claim 1, further comprising:
   determining, by the computing device, based on the deep neural network and at least one other gesture entered at the graphical keyboard prior to receiving the at least one gesture, at least one character string previously entered with the graphical keyboard, wherein determining the at least one character string comprises determining the at least one character string based on:
   the at least one gesture,
   the deep neural network, and
   the at least one character string previously entered with the graphical keyboard.

8. The method of claim 7, wherein the at least one character string and the at least one character string previously entered with the graphical keyboard comprise word phrases or sentences.

9. The method of claim 1, wherein the deep neural network functions as a spatial model of the graphical keyboard or both a language model of the graphical keyboard and the spatial model of the graphical keyboard.

10. The method of claim 1, wherein the deep neural network is configured to execute at one or more local processors of the computing device.

11. The method of claim 1, wherein the at least one gesture comprises one or more tap gestures, one or more continuous gestures, or a combination of one or more tap gestures and one or more continuous gestures.

12. A non-transitory computer-readable storage medium encoded with instructions that, when executed, cause at least one processor to:
- output, for display, a graphical keyboard that includes a plurality of keys;
- receive at least one gesture that selects one or more keys from the plurality of keys;
- determine, based on the at least one gesture and a deep neural network, at least one character string; and
- output, for display, the at least one character string.

13. The non-transitory computer-readable storage medium of claim 12, wherein the instructions, when executed, further cause the at least one processor to train the deep neural network based on input sequences corresponding to different selections of the plurality of keys for entering word phrases and sentences.

14. The non-transitory computer-readable storage medium of claim 12, wherein the instructions, when executed, further cause the at least one processor to:
- determine, based on the deep neural network and at least one other gesture entered at the graphical keyboard prior to receiving the at least one gesture, at least one character string previously entered with the graphical keyboard; and
- determine the at least one character string based on:
  - the at least one gesture,
  - the deep neural network, and
  - the at least one character string previously entered with the graphical keyboard.

15. The non-transitory computer-readable storage medium of claim 12, wherein the at least one processor comprises one or more local processors of a mobile computing device.

16. The non-transitory computer-readable storage medium of claim 12, wherein the at least one gesture comprises one or more tap gestures, one or more continuous gestures, or a combination of one or more tap gestures and one or more continuous gestures.

17. A computing device comprising at least one processor configured to:
- output, for display, a graphical keyboard that includes a plurality of keys;
- receive at least one gesture that selects one or more keys from the plurality of keys;
- determine, based on the at least one gesture and a deep neural network, at least one character string; and
- output, for display, the at least one character string.

18. The computing device of claim 17, wherein the deep neural network is trained based on input sequences corresponding to different selections of the plurality of keys for entering word phrases and sentences.

19. The computing device of claim 17, wherein the at least one processor is further configured to:
- determine, based on the deep neural network and at least one other gesture entered at the graphical keyboard prior to receiving the at least one gesture, at least one character string previously entered with the graphical keyboard; and
- determine the at least one character string based on:
  - the at least one gesture,
  - the deep neural network, and
  - the at least one character string previously entered with the graphical keyboard.

20. The computing device of claim 17, wherein the at least one gesture comprises one or more tap gestures, one or more continuous gestures, or a combination of one or more tap gestures and one or more continuous gestures.

* * * * *